US012264490B2

(12) United States Patent
Turnquist et al.

(10) Patent No.: US 12,264,490 B2
(45) Date of Patent: Apr. 1, 2025

(54) SYSTEM AND METHOD FOR MANUFACTURING A TOWER STRUCTURE

(71) Applicant: General Electric Company, Schenectady, NY (US)

(72) Inventors: Norman Arnold Turnquist, Carlisle, NY (US); Biao Fang, Clifton Park, NY (US); Pascal Meyer, Burnt Hills, NY (US); Gregory Edward Cooper, Greenfield Center, NY (US); Collin McKee Sheppard, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 247 days.

(21) Appl. No.: 17/988,047

(22) Filed: Nov. 16, 2022

(65) Prior Publication Data

US 2024/0159077 A1    May 16, 2024

(51) Int. Cl.
*E04H 12/34* (2006.01)
*B28B 1/00* (2006.01)
(Continued)

(52) U.S. Cl.
CPC ........... *E04H 12/341* (2013.01); *B28B 1/001* (2013.01); *B33Y 10/00* (2014.12); *B33Y 80/00* (2014.12);
(Continued)

(58) Field of Classification Search
CPC ............................ E04H 12/341; E04H 12/12
(Continued)

(56) References Cited

U.S. PATENT DOCUMENTS

| 1,033,887 | A | * | 7/1912 | Griffin | ..................... | E04H 12/12 |
| | | | | | | 52/423 |
| 1,069,328 | A | * | 8/1913 | Griffin | ..................... | E04H 12/12 |
| | | | | | | 52/423 |

(Continued)

FOREIGN PATENT DOCUMENTS

| CN | 110273571 A | * | 9/2019 | ............. E04B 1/642 |
| EP | 2773492 B1 | | 6/2017 | |

(Continued)

OTHER PUBLICATIONS

Zareiyan et al., Effects of Interlocking on Interlayer Adhesion and Strength of Structures in 3D Printing of Concrete, Automation in Construction, vol. 83, Nov. 2017, pp. 212-221. (Abstract Only) https://www.researchgate.net/publication/319162312_Effects_of_ interlocking_on_interlayer_adhesion_and_strength_of_strutures_in_ 3D_printing_of_concrete.

(Continued)

*Primary Examiner* — Brent W Herring
(74) *Attorney, Agent, or Firm* — Dority & Manning, P.A.

(57) ABSTRACT

A method for manufacturing a tower structure, the method including printing and depositing, with at least one variable-width deposition nozzle of a printhead assembly, one or more layers of at least one wall element of the tower structure, the at least one wall element having an outer circumferential surface and an inner circumferential surface. The method also including forming, with the at least one variable-width deposition nozzle, at least one void into the at least one wall element. The method also including placing at least one reinforcement member within the at least one void so as to position the at least one reinforcement member closer to a neutral axis of the at least one wall element than at least one of the outer circumferential surface or the inner circumferential surface.

14 Claims, 24 Drawing Sheets

(51) Int. Cl.
  *B33Y 10/00* (2015.01)
  *B33Y 80/00* (2015.01)
  *E04C 5/07* (2006.01)
  *E04G 21/04* (2006.01)
  *E04H 12/08* (2006.01)
  *E04H 12/12* (2006.01)
  *F03D 13/20* (2016.01)

(52) U.S. Cl.
  CPC .......... *E04C 5/073* (2013.01); *E04G 21/0427* (2013.01); *E04H 12/085* (2013.01); *E04H 12/12* (2013.01); *F03D 13/20* (2016.05); *E04G 2021/049* (2013.01)

(58) Field of Classification Search
  USPC ..... 52/295, 843, 223.4, 651.01, 651.07, 698
  See application file for complete search history.

(56) References Cited

U.S. PATENT DOCUMENTS

| | | | | |
|---|---|---|---|---|
| 1,919,491 | A * | 7/1933 | Waggoner | E04H 12/12 52/649.4 |
| 3,987,593 | A * | 10/1976 | Svensson | E01F 9/631 52/843 |
| 4,738,058 | A * | 4/1988 | Svensson | F21V 21/10 52/843 |
| 6,938,392 | B2 * | 9/2005 | Fouad | E04H 12/12 52/223.4 |
| 7,116,282 | B2 * | 10/2006 | Trankina | E04H 12/2292 52/98 |
| 10,486,330 | B2 | 11/2019 | Giles | |
| 10,907,375 | B2 | 2/2021 | Khoshnevis | |
| 11,021,887 | B2 | 6/2021 | Keller et al. | |
| 2007/0266670 | A1 * | 11/2007 | Williams | E04H 12/02 52/843 |
| 2008/0209842 | A1 * | 9/2008 | Montaner Fraguet | E04H 12/16 52/651.07 |
| 2009/0031639 | A1 * | 2/2009 | Cortina/Cordero | E04H 12/12 52/745.18 |
| 2011/0138704 | A1 * | 6/2011 | Bagepalli | E04H 12/16 52/147 |
| 2012/0311948 | A1 * | 12/2012 | Hangel | E04H 12/342 52/297 |
| 2014/0252668 | A1 | 9/2014 | Austin et al. | |
| 2017/0305034 | A1 | 10/2017 | Grivetti et al. | |
| 2018/0071949 | A1 * | 3/2018 | Giles | B28B 1/001 |
| 2019/0292803 | A1 | 9/2019 | Meyer et al. | |
| 2021/0107177 | A1 * | 4/2021 | Giles | E04B 1/35 |
| 2021/0396034 | A1 | 12/2021 | Turnquist et al. | |
| 2021/0396213 | A1 | 12/2021 | Cooper | |
| 2022/0032496 | A1 | 2/2022 | Fang et al. | |
| 2022/0032497 | A1 | 2/2022 | Turnquist et al. | |
| 2022/0034108 | A1 | 2/2022 | Cooper et al. | |
| 2022/0034115 | A1 | 2/2022 | Turnquist et al. | |
| 2022/0034116 | A1 | 2/2022 | Turnquist et al. | |
| 2022/0034303 | A1 | 2/2022 | Turnquist et al. | |
| 2022/0049521 | A1 | 2/2022 | Turnquist et al. | |
| 2022/0412107 | A1 * | 12/2022 | Turnquist | E04G 11/22 |
| 2023/0135211 | A1 * | 5/2023 | Li | B28B 23/02 428/34.1 |

FOREIGN PATENT DOCUMENTS

| | | |
|---|---|---|
| WO | WO 2004/065707 | 8/2004 |
| WO | WO 2020/252532 | 12/2020 |
| WO | WO 2021/101558 | 5/2021 |
| WO | WO2021145818 A1 | 7/2021 |

OTHER PUBLICATIONS

EPO Search Report, May 2, 2024.

* cited by examiner

SYSTEM AND METHOD FOR MANUFACTURING A TOWER STRUCTURE

FIELD

The present disclosure relates in general to tower structures, and more particularly to systems and methods for additively manufacturing a tower structure, such as for supporting wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Tower structures, and in particular wind turbine towers, are often constructed of steel tubes, pre-fabricated concrete sections, or combinations thereof. Further, the tubes and/or concrete sections are typically formed off-site, shipped on-site, and then arranged together to erect the tower. For example, one manufacturing method included forming precast concrete rings, shipping the rings to the site, arranging the rings atop one another, and then securing the rings together. As tower heights increase, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g., via bolting and/or welding. Such methods, however, require extensive labor and can be time-consuming.

Thus, the art is continuously seeking new and improved methods for manufacturing towers. In particular, the present disclosure is directed to systems and methods for additively manufacturing tower structures on-site using automated additive printing devices.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure. Embodiments of the method include printing and depositing, with at least one variable-width deposition nozzle of a printhead assembly, one or more layers of at least one wall element of the tower structure, the at least one wall element having an outer circumferential surface and an inner circumferential surface. Embodiments of the method also include forming, with the at least one variable-width deposition nozzle, at least one void into the at least one wall element. Embodiments of the method also include placing at least one reinforcement member within the at least one void so as to position the at least one reinforcement member closer to a neutral axis of the at least one wall element than at least one of the outer circumferential surface or the inner circumferential surface.

In still another aspect, the present disclosure is directed to a tower structure wherein at least one reinforcement member in at least one void positions the at least one reinforcement member closer to a neutral axis of at least one printed wall element than at least one of an outer circumferential surface or the inner circumferential surface of the at least one printed wall element. In particular, embodiments of the tower structure include a base tower section having the at least one printed wall element, the at least one printed wall element having the outer circumferential surface and the inner circumferential surface. Embodiments of the tower structure also include a transition assembly arranged adjacent to the base tower section. Embodiments of the tower structure include at least one void formed into the at least one printed wall element during printing and depositing of the at least one printed wall element. Embodiments of the tower structure include at least one reinforcement member positioned within the at least one void, the at least one reinforcement member extending through at least a portion of the base tower section and at least partially through the transition assembly.

In still another aspect, the present disclosure is directed to a tower structure wherein at least one reinforcement member in at least one void places the at least one reinforcement member closer to a neutral axis of the tower structure than at least one of an outer circumferential surface or an inner circumferential surface of the tower structure. In particular, embodiments of the tower structure include at least two printed wall elements arranged adjacent to each other. Embodiments of the tower structure also include the at least one void between the at least two printed wall elements formed during printing and depositing of the at least two printed wall elements. Embodiments of the tower structure also include the at least one reinforcement member positioned within the at least one void.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
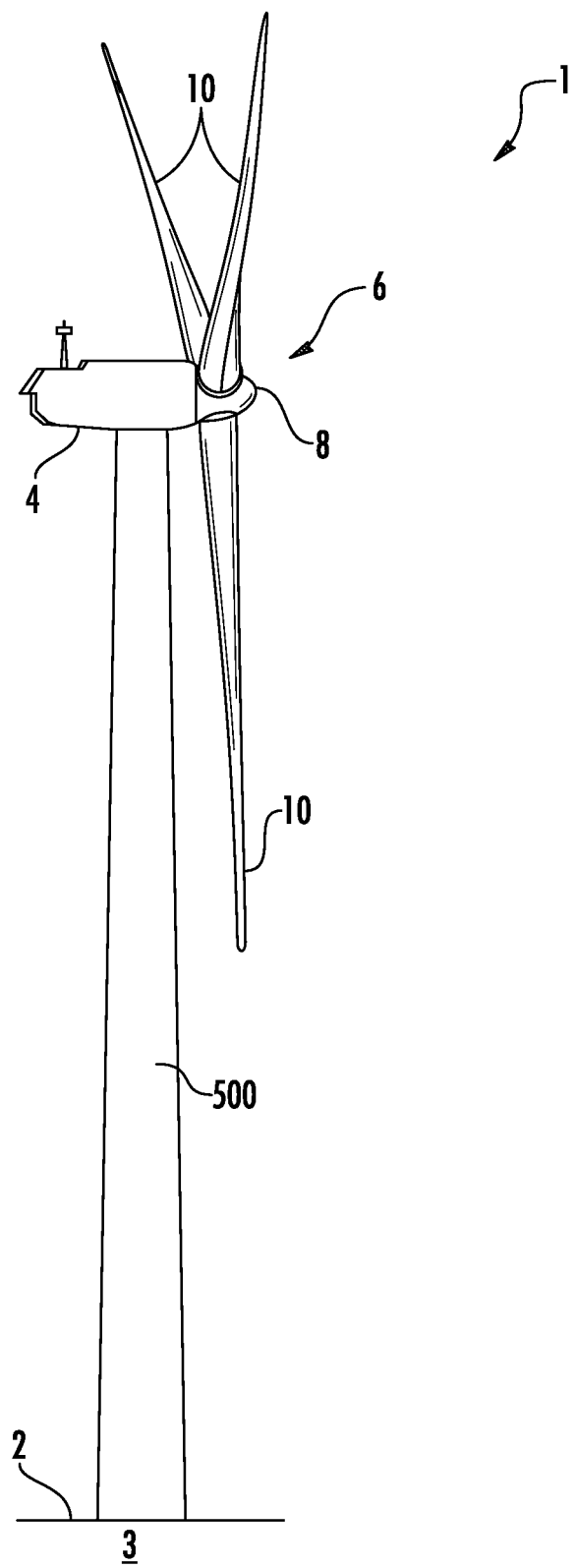
FIG. 1 illustrates a perspective view of an embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to an additive printing device and methods for manufacturing a structure, such as a tower structure for supporting a wind turbine. "Additively manufactured structures" as used herein generally refers to structures formed using automated deposition of sequential layers (e.g., print layers) of cementitious material, such as concrete, and/or other construction materials, using additive manufacturing, 3-D printing, spray deposition, extrusion additive manufacturing, concrete printing, automated fiber deposition, as well as other techniques that utilize computer numerical control and multiple degrees of freedom to deposit material.

"Additive manufacturing" as used herein refers to processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers but are also capable of printing curved and/or irregular shapes.

For example, in an embodiment, the present disclosure is directed to a method for forming at least one void (e.g., by forming a recess, a scallop, a groove, a notch, etc.) in an inner circumferential surface and/or an outer circumferential surface of a wall element of a tower structure using a variable-width deposition nozzle. Thus, the void(s) of the wall element of the tower structure may be sized to have a depth that extends to a point before, up to, or beyond a midline reference curve of the wall element. As such, in an embodiment, this depth may facilitate the positioning of at least one reinforcement member, such as a tensioning tendon, within the void(s).

By placing the reinforcement member(s) within the void(s), the reinforcement member(s) may be situated at or near a neutral axis of the wall element(s). Accordingly, compressive forces experienced by the wall element are more evenly distributed across a thickness or a width of the wall element than is possible when the reinforcement member(s) is displaced from the neutral axis. It should be appreciated that reinforcement members, such as tensioning tendons, for example, positioned at a distance away from the neutral axis tend to create a moment within the wall element. Thus, in order to counter this moment, a tower structure incorporating such wall element requires additional reinforcement members and/or structural components in order to attain a desired load bearing capability. These additional requirements increase the cost and/or the complexity of the tower structure and of any methods of manufacturing the tower structure. As such, placing the reinforcement member(s) at or near the neutral axis of the wall element precludes and/or mitigates the aforementioned issues and, therefore, can be beneficial in the manufacturing of the tower structure.

In another embodiment, the present disclosure is further directed to a method for manufacturing a tower structure that includes a wall element defining one or more voids in an inner circumferential surface and/or an outer circumferential surface of the wall element(s) (or one or more voids in the middle of the single wall element). Such voids, as mentioned, may be formed using, for example, the variable-width deposition nozzle of the printhead assembly.

In particular embodiments, for example, the variable-width deposition nozzle may have a fixed side and a variable side, or two variable side(s), for example. Thus, in an embodiment, the variable-width deposition nozzle may be configured to alter the width of a deposition path while the printhead assembly remains in a fixed orientation and/or a fixed radial position and following a fixed print path, for example. In particular, the variable-width deposition nozzle may vary or adjust the deposition path, e.g., vary or adjust the distance for depositing material on one or both sides of the print path. The deposition nozzle may also vary or adjust the distance for depositing material on only one side of the print path while the other side of the deposition nozzle remains fixed. Moreover, a fixed side of the variable-width deposition nozzle may remain fixed and a variable side may be variably aligned towards and away from the inner circumferential surface or the outer circumferential surface throughout the printing process. Moreover, the variable-width deposition nozzle may dictate the radial position of one side or both sides of the deposition path (e.g., the inner circumferential surface or the outer circumferential surface of a wall element) and even separate each side to form a void in a single wall element.

In other words, in an embodiment, the printhead assembly and the variable-width deposition nozzle(s) according to the present disclosure may follow a fixed print path at a fixed distance from a vertical axis of the tower structure but the variable-width deposition nozzle may change the shape, width, magnitude, and/or position of a deposition footprint. In an embodiment the variable-width deposition nozzle may also include a number of panels or other structures that may be articulated, radially shifted, or laterally slid, to change the shape, width, magnitude, or position of the deposition footprint. By changing the structure and/or orientation of the variable-width deposition nozzle, for example, the deposition nozzle is configured to dictate the radial position of one or both sides of a deposition footprint and/or the overall deposition path. In this way, the flow of the cementitious material on at least one side of the variable-width deposition nozzle and the flow in general may be directed away from the vertical axis (e.g., displaced radially from the vertical axis of the printhead assembly). It should be appreciated that modifying the radial position of at least one side of the deposition footprint without necessitating a corresponding modification on the other side of the deposition footprint and without necessitating radial movement of the printhead assembly away from the fixed print path may increase the print speed and/or flow rate of the additive printing device.

Referring now to the drawings, FIG. 1 illustrates a perspective view of an embodiment of a tower structure 500 according to the present disclosure. As depicted in FIG. 1, the tower structure 500 may be a component of a wind turbine 1. As shown, the wind turbine 1 generally includes a tower structure 500 extending from a support surface 2 on top of a foundation 3, a nacelle 4 mounted on the tower structure 500, and a rotor 6 coupled to the nacelle 4. The rotor 6 includes a rotatable hub 8 and at least one rotor blade 10 coupled to and extending outwardly from the rotatable hub 8. For example, in the illustrated embodiment, the rotor 6 includes three rotor blades 10. However, in another embodiment, the rotor 6 may include more or less than three rotor blades 10. Each rotor blade 10 may be spaced about the rotatable hub 8 to facilitate rotating the rotor 6 to enable kinetic energy to be transferred from the wind into usable mechanical energy, and subsequently, electrical energy. For instance, the rotatable hub 8 may be rotatably coupled to an electric generator (not shown) positioned within the nacelle 4 to permit electrical energy to be produced.

It should be appreciated that while discussed herein in reference to a wind turbine tower, the present disclosure is not limited to wind turbine towers but may be utilized in any application having concrete construction and/or tower structures. For example, the present disclosure may be utilized in the additive manufacturing of homes, buildings, portions of buildings, bridges, towers, poles, and other aspects of the concrete industry. Further, the methods described herein may also apply to manufacturing any similar structure that benefits from the advantages described herein, e.g., any support tower or structure, such as a cooling tower, a communications tower, a bridge pylon, a smokestack, a transmission tower, an observation tower, a building, a water tower, and/or other similar structures.

Figure 2:
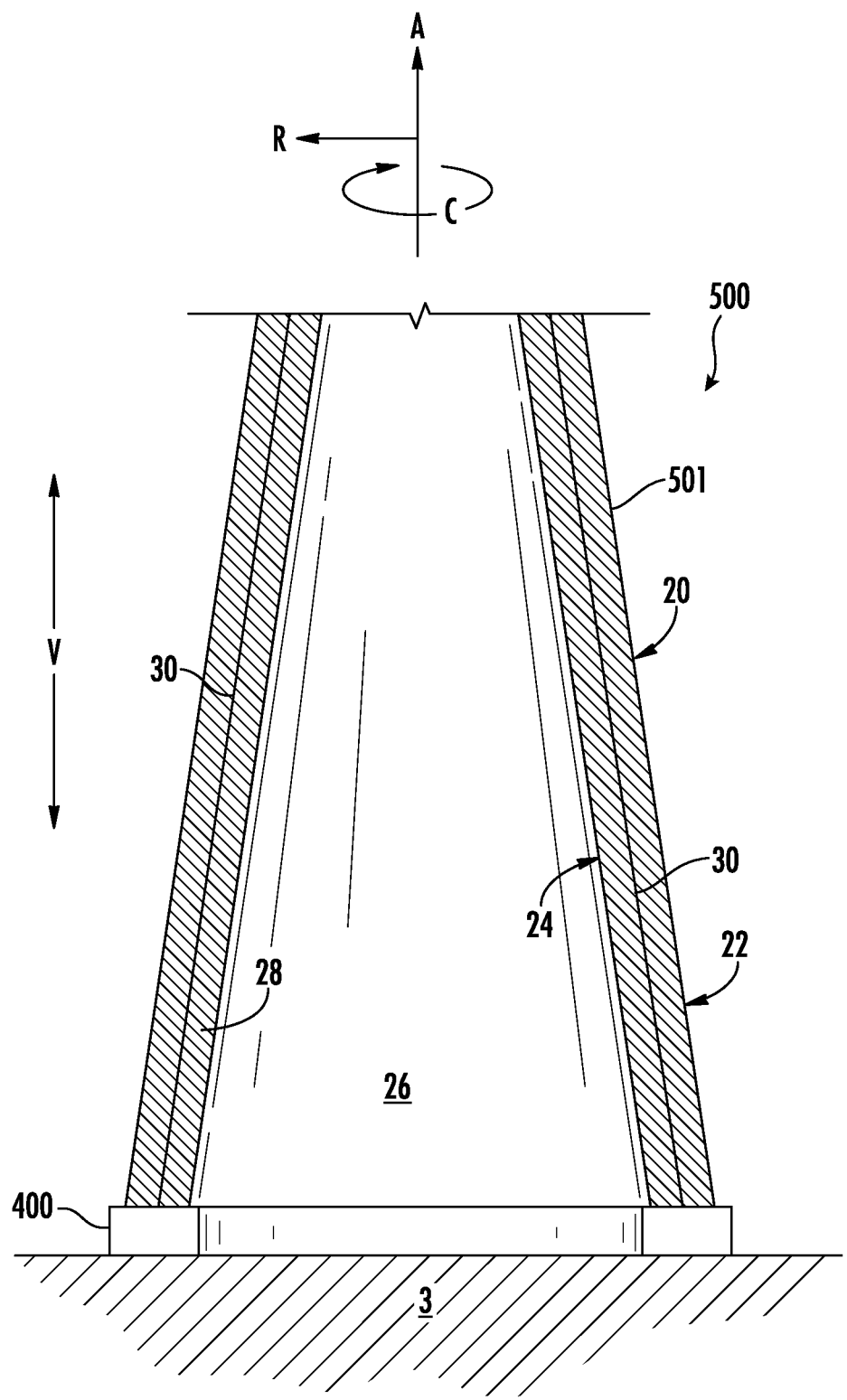
FIG. 2 illustrates a partial, cross-sectional view of an embodiment of a tower structure of a wind turbine according to the present disclosure.

Referring now to FIG. 2, the tower structure 500 of the wind turbine 1 of FIG. 1 is described in more detail according to an embodiment. Specifically, FIG. 2 illustrates a partial, cross-sectional view of an embodiment of the tower structure 500. In particular, as shown, the tower structure 500 includes at least one tower section 501. Further, as shown, the tower structure 500 defines a generally circumferential tower wall 20 having an outer wall element 22 and an inner wall element 24 held on a base 400. In another embodiment, the circumferential tower wall 20 has no base 400. Moreover, as shown in the illustrated embodiment, the circumferential tower wall 20 generally defines a hollow interior 26 that is commonly used to house various components of the wind turbine 1 (e.g., a power converter, transformer, etc.). Moreover, in an embodiment, the tower structure 500 described herein may be formed using additive manufacturing and additive manufacturing equipment may be engaged to and climb on the inner wall element 24 while in the hollow interior 26.

Furthermore, as shown, the tower structure 500 may be formed of one or more cementitious materials reinforced with one or more reinforcement members 30, such as elongated cables or wires, helical cables or wires, reinforcing bars (also referred to as rebar), mesh reinforcing fibers (metallic or polymeric), reinforcing metallic rings (circular, oval, spiral and others as may be relevant), and/or couplings. According to an embodiment, the cementitious material may be provided through any suitable supply system 32 (see, e.g., FIG. 4). Further, in an embodiment, the reinforcement members 30 may be precisely placed, tracked, mapped, and embedded in the cementitious material during the printing process. As used herein, the cementitious materials may include any suitable workable paste that is configured to bind together after curing to form a structure. Suitable cementitious materials include, for example, concrete, pitch resin, asphalt, geopolymers, polymers, cement, mortar, cementitious compositions, or similar materials or compositions.

According to an embodiment of the present disclosure, an adhesive material, a cold joint primer, and/or steel/metal/alloy/composite frame(s) or end cap(s) in the form of C-shaped frames, for example, may also be provided between the cementitious materials and the foundation 3, the cementitious material and the reinforcement members 30, or between multiple layers of the cementitious material and the reinforcement members 30. Thus, these materials may further assist with interlayer bonding between materials, facilitate integration or use of pre-fabricated components or formwork, or simply provide aesthetic benefits (e.g., capping off the rough edges of an additively manufactured wall of cementitious material in a tower structure 500).

"Adhesive material" as used herein refers to cementitious material such as mortar, polymeric materials, and/or admixtures of cementitious material and polymeric material. Adhesive formulations that include cementitious material are referred to herein as "cementitious mortar." "Cementitious mortar" as used herein refers to any cementitious material that may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Polymeric materials that may be utilized in an adhesive formulation include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of certain polymeric materials are described in ASTM C1059/C1059M-13, Standard Specification for Latex Agents for Bonding Fresh to Hardened Concrete.

Figure 3:
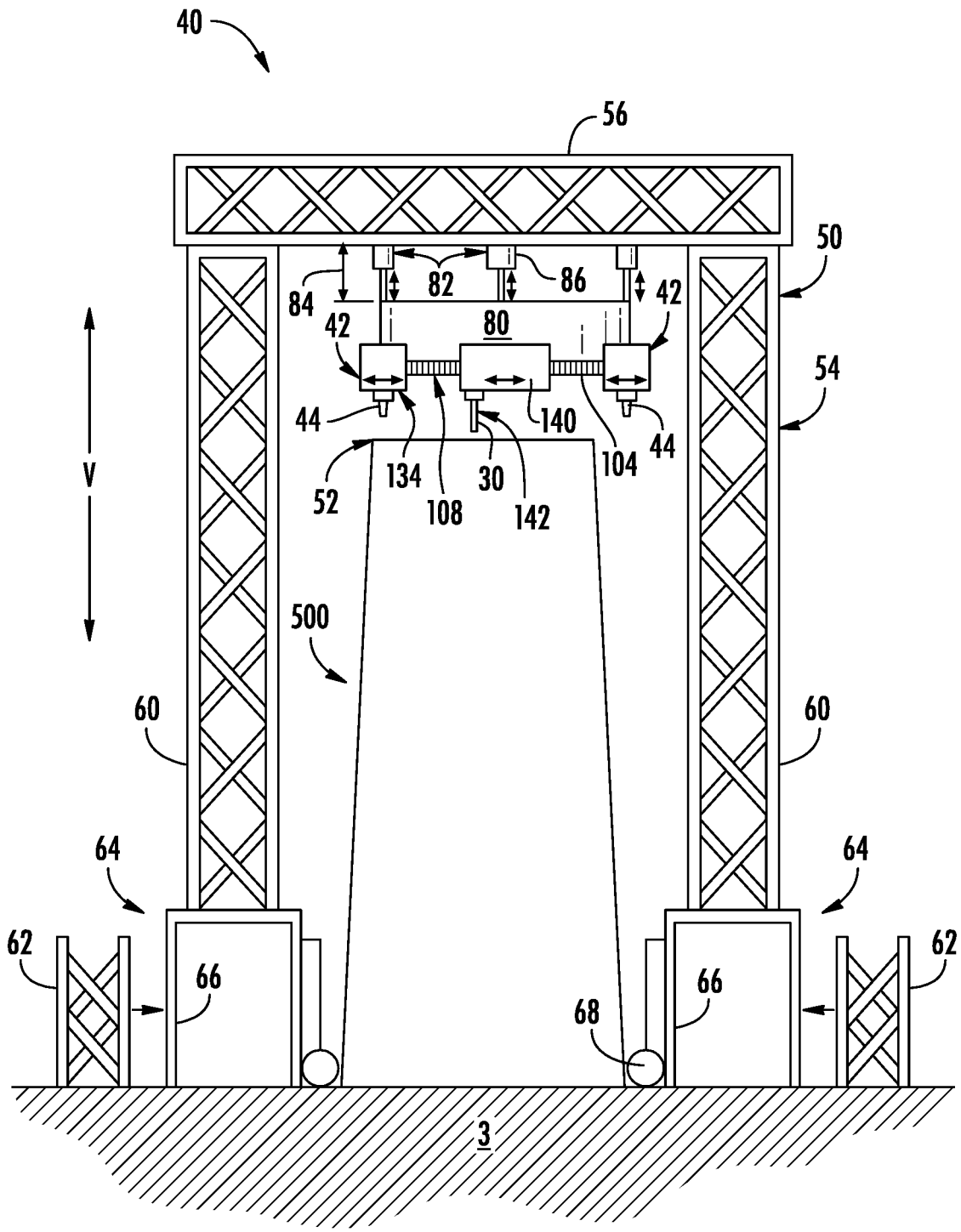
FIG. 3 illustrates a schematic view of an embodiment of an additive printing device being used to print structures according to the present disclosure.
Figure 4:
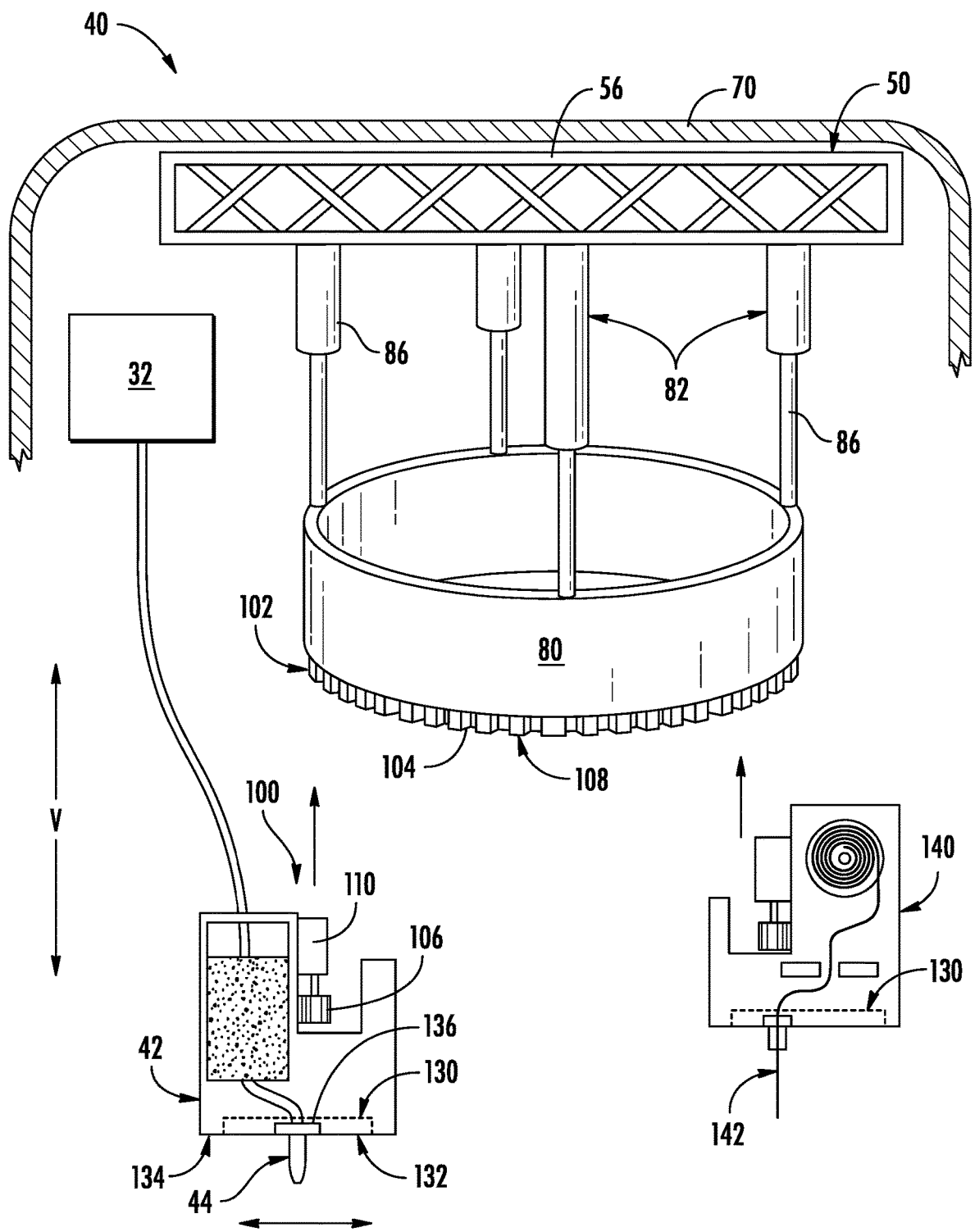
FIG. 4 illustrates a close-up view of certain components of the additive printing device of FIG. 3 according to the present disclosure.
Figure 5:
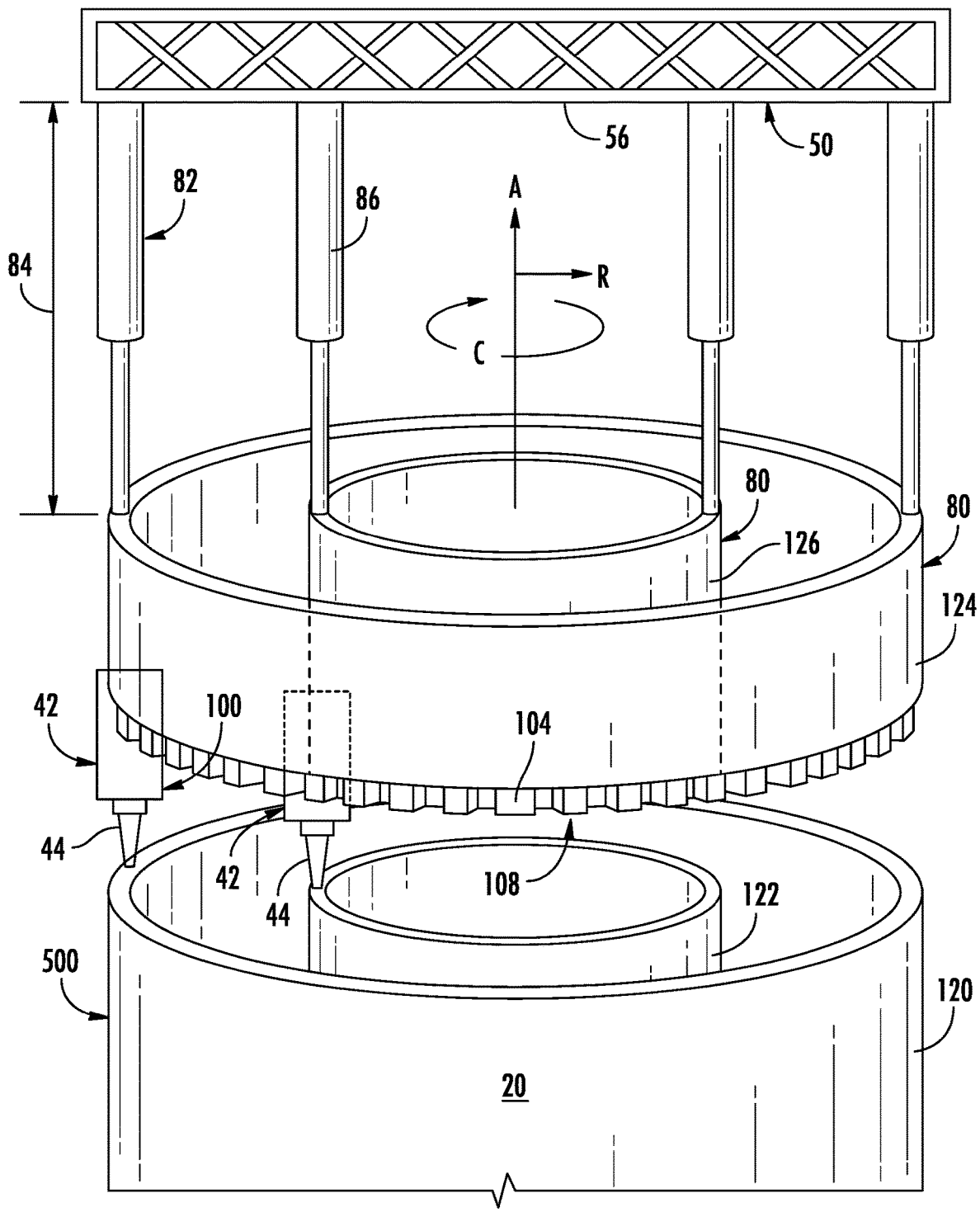
FIG. 5 illustrates another close-up view of an embodiment of certain components of an additive printing device according to the present disclosure.

Referring now to FIGS. 3-5, various views of an embodiment of an additive printing device 40 is illustrated according to an embodiment of the present disclosure. Notably, all or part of tower structure 500 of FIGS. 1-2 may be printed, layer-by-layer, or cast via material deposition or material backfill, using the additive printing device 40, which may use any suitable mechanisms for depositing layers of additive material or quantities of material, such as cementitious material, to form the tower structure 500. In particular, as shown, the additive printing device 40 includes one or more printheads 42 having one or more deposition nozzles 44, for example, for printing and depositing material. Moreover, in an embodiment, the printhead(s) 42 are controlled by a controller 200 (see e.g., FIG. 8) to form an object programmed within the controller processor (such as a CAD file; described in detail herein). Thus, in an embodiment, the deposition nozzles 44 of the printhead(s) 42 may be independently or simultaneously movable to print layers of the tower structure 500.

The additive printing device 40 may also include a vertical support structure 50 which is generally configured for suspending one or more of the printheads 42 above the foundation 3 during the printing process. In this regard, the vertical support structure 50 may extend substantially along a vertical direction V to a position at least partially above a top 52 of the tower structure 500.

In addition, as shown, the vertical support structure 50 may include a plurality of support towers 54 and one or more gantry beams 56 that extend between at least two of the support towers 54. Although two support towers 54 and a single gantry beam 56 are illustrated in the FIGS. 3-5, it should be appreciated that any suitable number and position of support towers 54 may be used according to alternative embodiments. In addition, the support towers 54 and the gantry beams 56 are illustrated as being truss-like structures (e.g., similar to a tower crane), but could be formed in any other suitable manner or have any other configuration according to alternative embodiments.

In addition, although the vertical support structure 50 is illustrated as being positioned on the outside of the tower structure 500, it should be appreciated that according to alternative embodiments, the vertical support structure 50 may be positioned inside the tower structure 500. According to still other embodiments, the vertical support structure 50 may include the support towers 54 positioned both inside and outside of the tower structure 500. In addition, the additive printing device 40 may be suspended from the vertical support structure 50 using any other suitable system or mechanism.

Notably, during the additive printing process, the tower structure 500 is built layer-by-layer, rising along the vertical direction V. Therefore, the vertical support structure 50 may be an expandable support structure which may be raised along with the height of tower structure 500. In this regard, the vertical support structure 50 may be formed from a plurality of stacked segments 60 (see e.g., FIG. 3) which are positioned adjacent each other along the vertical direction V and joined to form the rigid vertical support structure 50. Thus, as the tower structure 500 is built up, additional segments 62 may be added to stacked segments 60 to raise the overall height of vertical support structure 50.

Referring specifically to FIG. 3, the additional segments 62 may be combined with the stacked segments 60 to raise the vertical support structure 50 using, for example, a jacking system 64. In general, as shown, the jacking system 64 may be positioned proximate foundation 3 and is configured for raising the vertical support structure 50 (e.g., including the stacked segments 60 and the gantry beams 56) and inserting additional segments 62. Specifically, a separate jacking system 64 may be positioned at a bottom of each support tower 54.

According to an embodiment, the jacking system 64 may include a jacking frame 66 and a jacking mechanism 68 which are positioned at the bottom of stacked segments 60. The jacking mechanism 68 described herein may generally be any suitable hydraulically, pneumatically, or other mechanically actuated system for raising the vertical support structure 50. Accordingly, when additional segments 62 need to be added, a dedicated jacking mechanism 68 simultaneously raises each of the support towers 54 such that additional segments 62 may be inserted. Specifically, the jacking frame 66 may support the weight of the vertical support structure 50 as additional segments 62 are positioned below the lowermost stacked segments 60. Additional segments 62 are joined to stacked segments 60 using any suitable mechanical fasteners, welding, etc. This process may be repeated as needed to raise the total height of the vertical support structure 50.

In certain situations, it may be desirable to protect the tower structure 500 and components of the additive printing device 40 from the external environment in which they are being used. In such embodiments, as shown in FIG. 4, a tower cover 70 may generally be any suitable material positioned around the vertical support structure 50. For example, the tower cover 70 may be a fabric-like material draped over or attached to the vertical support structure 50 (e.g., over the support towers 54 and/or the gantry beams 56).

As mentioned above, the vertical support structure 50 is generally configured for supporting one or more of the printheads 42 and or other modules which facilitate the formation of the tower structure 500. Referring specifically to FIGS. 3 through 5, the additive printing device 40 may further include one or more support members, such as support rings 80, that are suspended from the vertical support structure 50, or more specifically from gantry beams 56, above the tower structure 500. For example, as illustrated, the support ring 80 is mounted to the gantry beam 56 using a vertical positioning mechanism 82. In general, the vertical positioning mechanism 82 is configured for adjusting a height or vertical distance 84 measured between the gantry beam 56 and a top of support ring 80 along the vertical direction V. For example, the vertical positioning mechanism 82 may include one or more hydraulic actuators 86 extending between gantry beam 56 and support ring 80 for moving the support ring 80 and the printheads 42 along the vertical direction V as tower structure 500 is built up layer-by-layer.

As illustrated, the hydraulic actuators 86 are configured for adjusting the vertical distance 84 to precisely position the deposition nozzles 44 of the printheads 42 immediately above top 52 of the tower structure 500. In this manner, the additive printing process may be precisely controlled. However, it should be appreciated that according to alternative embodiments, the vertical motion of the printheads 42 may be adjusted in any other suitable manner. For example, according to an embodiment, the support ring 80 may be rigidly fixed to the gantry beam 56 while the support ring 80 and/or the printheads 42 are used to facilitate vertical motion to precisely position the deposition nozzles 44. For example, the printheads 42 may be slidably mounted to the support ring 80 using a vertical rail and positioning mechanism to adjust the vertical position relative to the support ring 80 and the tower structure 500.

As best shown in FIGS. 4 and 5, for example, the printhead(s) 42 is movably coupled to the support ring 80 such that the deposition nozzles 44 may deposit cementitious material around a perimeter of tower structure 500 while the support ring 80 remains rotationally fixed relative to gantry beam 56. In this regard, for example, a drive mechanism 100 may operably couple the printhead(s) 42 to the support ring 80 such that printhead(s) 42 may be configured for moving around a perimeter 102 of the support ring 80 (e.g., about a circumferential direction C) while selectively depositing the cementitious material. An embodiment of the drive mechanism 100 is described below and illustrated in the figures, but it should be appreciated that other drive mechanisms are contemplated and within the scope of the present disclosure.

According to the illustrated embodiment, the drive mechanism 100 may include a drive gear 106 that is rotatably mounted to printhead 42. The drive gear 106 is configured to engage with a ring gear 104 that is positioned on the support ring 80. Specifically, as illustrated, the ring gear 104 is defined on a bottom 108 of the support ring 80. Thus, when printhead(s) 42 is mounted on the bottom 108 of support ring 80, drive gear 106 engages ring gear 104. The drive mechanism 100 may further include a drive motor 110 that is mechanically coupled to the drive gear 106 for selectively rotating the drive gear 106 to move printhead(s) 42 around the perimeter 102 of the support ring 80. In this manner, the support ring 80 may remain stationary while printhead(s) 42 moves around the support ring 80 while depositing the cementitious material to form a cross-sectional layer of tower structure 500.

Although the drive mechanism 100 is illustrated herein as a rack and pinion geared arrangement using drive gear 106 and ring gear 104, it should be appreciated that any other suitable drive mechanism 100 may be used according to alternative embodiments. For example, the drive mechanism 100 may include a magnetic drive system, a belt drive system, a frictional roller drive system, or any other mechanical coupling between printhead(s) 42 and support ring 80 which permits and facilitates selective motion between the two.

In addition, in an embodiment, the support ring 80 may generally have a diameter that is substantially equivalent to a diameter of the tower structure 500. However, it may be desirable to print the tower structure 500 having a non-fixed diameter or a tapered profile. In addition, as illustrated for example in FIG. 5, the tower structure 500 may include an outer tower wall 120 spaced apart along a radial direction R from an inner tower wall 122. For example, the outer tower wall 120 may be printed to define a mold for receiving poured concrete, e.g., to decrease printing time and total construction time.

Thus, as shown in FIG. 5, the additive printing device 40 may include a plurality of concentric support rings 80 and printheads 42 for simultaneously printing each of the outer tower wall 120 and the inner tower wall 122. Specifically, as illustrated, an outer support ring 124 may be positioned above the outer tower wall 120 and have a substantially equivalent diameter to the outer tower wall 120. Similarly, the inner support ring 126 may be positioned above the inner tower wall 122 and have a substantially equivalent diameter to the inner tower wall 122. According to this embodiment, each of outer support ring 124 and inner support ring 126 may include dedicated printheads 42 and/or other modules for facilitating the printing process of outer tower wall 120 and inner tower wall 122, respectively.

Referring again to FIG. 4, the printhead (s) 42 may include mechanisms for adjusting the position of the deposition nozzles 44 on the printhead(s) 42. For example, the printhead(s) 42 may include a radial adjustment mechanism 130 that is configured for moving the deposition nozzle(s) 44 along the radial direction R. Specifically, according to the illustrated embodiment, the radial adjustment mechanism 130 includes a slide rail 132 mounted to a bottom 134 of the printhead 42. The slide rail 132 extends substantially along the radial direction and is configured for slidably receiving the deposition nozzle 44.

The radial adjustment mechanism 130 may further include an actuating mechanism 136 that moves the deposition nozzle(s) 44 along the radial direction R within the slide rail 132. For example, the actuating mechanism 136 may include any suitable actuator or positioning mechanism for moving the deposition nozzle 44 within the slide rail 132. In this regard, for example, the actuating mechanism 136 may include one or more of a plurality of linear actuators, servomotors, track conveyor systems, rack and pinion mechanisms, ball screw linear slides, etc.

Referring still to FIGS. 4 and 5, the additive printing device 40 may include any other suitable number of subsystems or modules to facilitate and improved printing process or improved finishing of tower structure 500. For example, as illustrated in FIG. 4, the additive printing device 40 may include a reinforcement module 140 which may be movably coupled to the support ring 80 and configured for embedding one or more reinforcement members 142 at least partially within tower structure 500. Such reinforcement member(s) 142, for example, may be synonymous with the reinforcement member(s) 30 described herein and may thus include elongated cables or wires, helical cables or wires, reinforcing bars (also referred to as rebar), mesh reinforcing fibers (metallic or polymeric), reinforcing metallic rings (circular, oval, spiral and others as may be relevant), and/or couplings In this regard, for example, the reinforcement module 140 may be similar to the printhead(s) 42 in that engages the support ring 80 and may move around the perimeter 102 of the support ring 80 while depositing the reinforcement members 142.

Thus, as shown in FIG. 2, the reinforcement module 140 may be configured to embed one or more reinforcement members 142 at least partially within one or more of portions of the tower structure 500. In this regard, the reinforcement module 140 is configured to position the reinforcement member(s) 142 at least partially within the tower structure 500. It should be understood that such reinforcement members 142 may extend along the entire height of the tower structure 500 (e.g., as shown in FIG. 2) or along only a portion of the tower height.

Similarly, referring still to FIGS. 3 and 4, the additive printing device 40 also may be configured to supply backfill material, for example, via a mechanism movably coupled to the support ring 80 and configured for depositing backfill material and/or any other quantity of material as described herein. In this regard, for example, such a mechanism may be similar to the printhead(s) 42 and/or reinforcement module 140 in that it engages the support ring 80 and may move around the perimeter 102 of the support ring 80 while depositing a backfill material. For example, according to an embodiment, the backfill material described herein may include any suitable workable paste that is configured to bind together after curing to form a structure. Suitable materials include, for example, concrete, pitch resin, asphalt, clay, cement, mortar, cementitious compositions, geopolymer materials, polymer materials, or similar materials or compositions. Other suitable materials, for casting include, for example, steel, aluminum, and other alloys, compositions, and materials.

Figure 6:
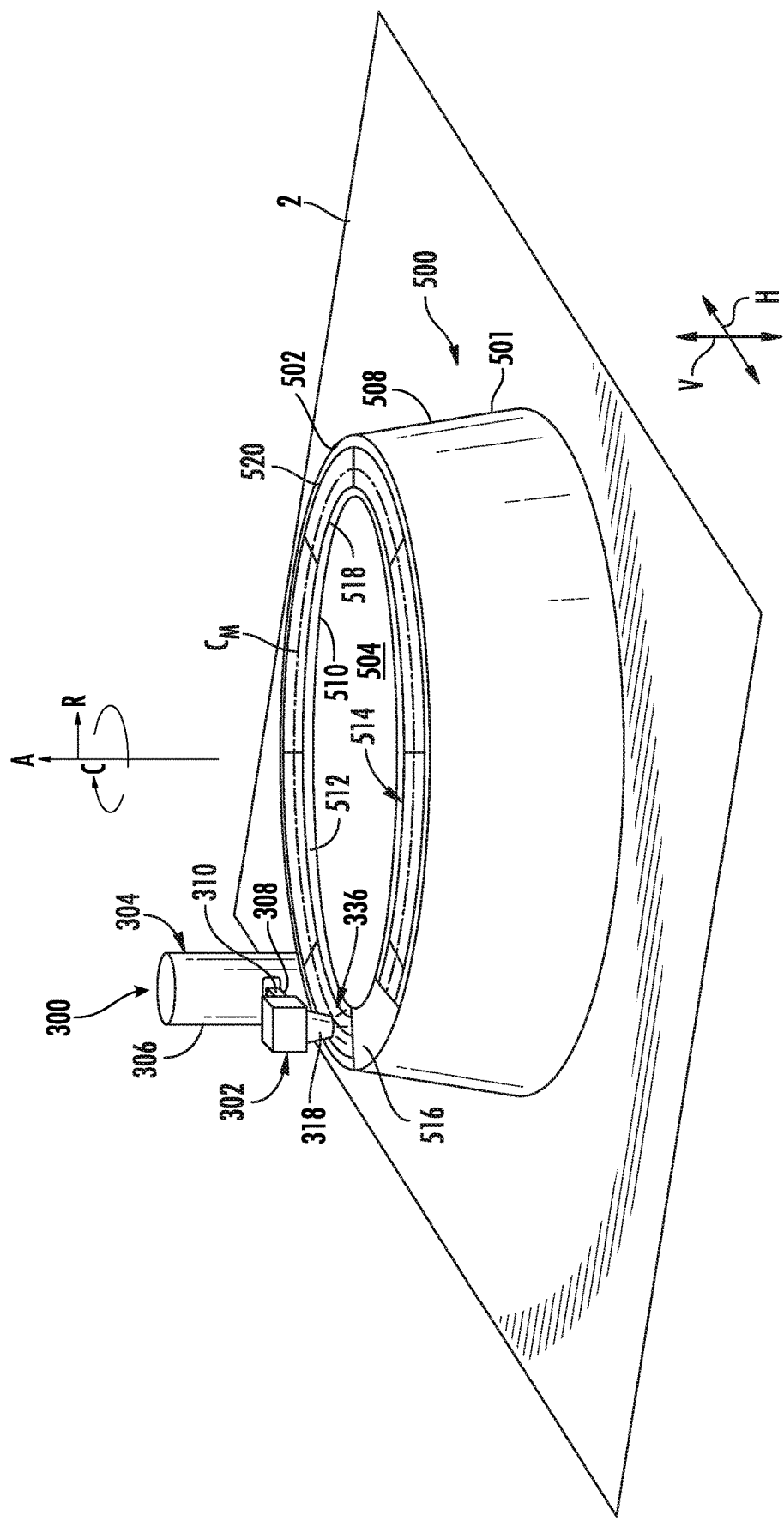
FIG. 6 illustrates a perspective view of another embodiment of an additive printing device being used to print the structures according to the present disclosure.
Figure 7:
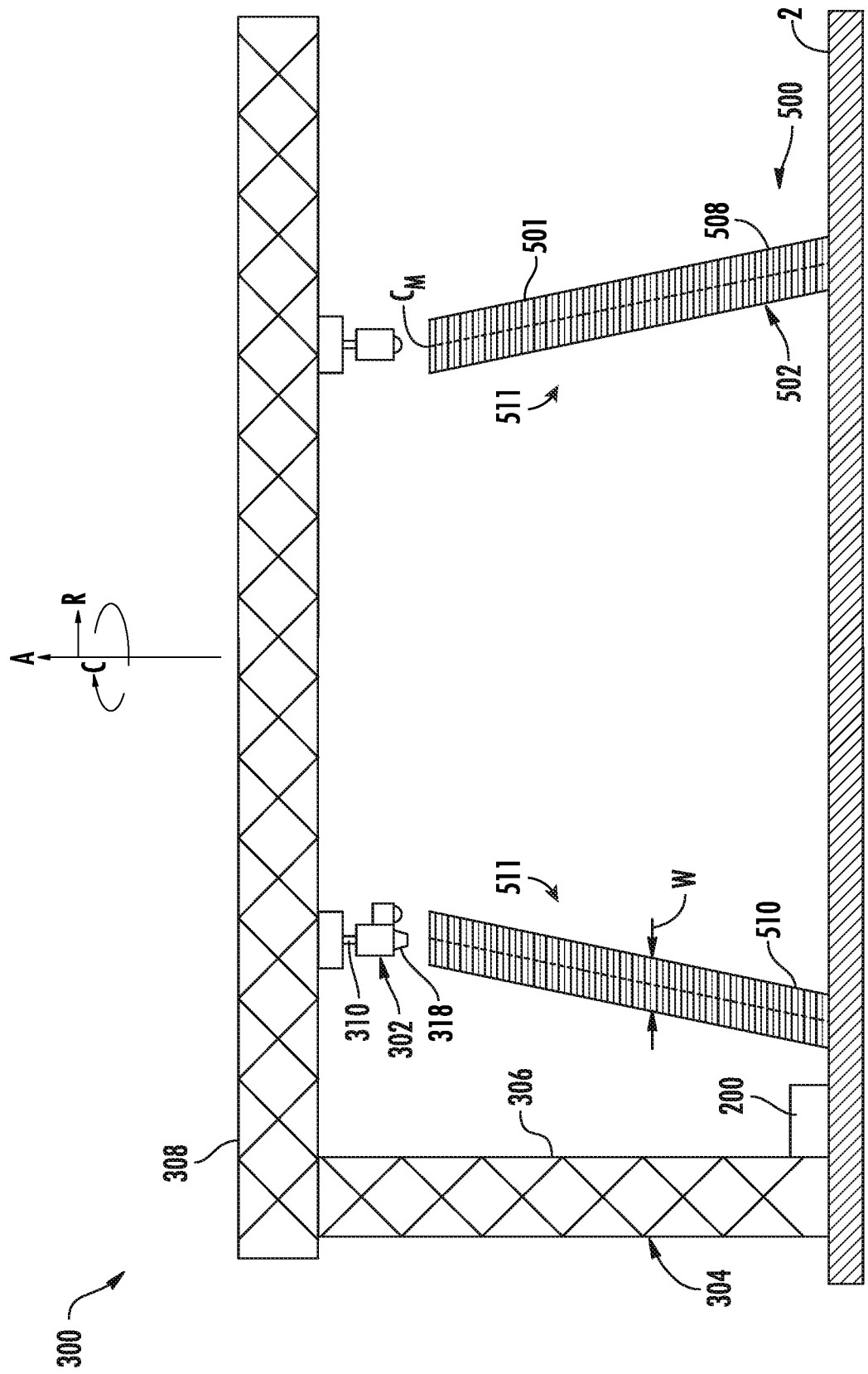
FIG. 7 illustrates a side perspective view of certain components of the additive printing device of FIG. 6 according to the present disclosure.

Referring now to FIGS. 6 and 7, various views of another embodiment of an additive printing device for forming a tower section of a tower structure are illustrated, in particular, an additive printing device 300 for forming a tower section 501 of a tower structure 500. As shown, the tower section 501 may be formed by depositing one or more layers of a wall 502 with a printhead assembly 302 of the additive printing device 300. In an embodiment, as shown, the wall 502 may circumscribe or at least partially circumscribe a vertical axis ($V_A$) of the tower structure 500. Each wall 502 may for example, be one of a plurality of print layers in an axially aligned arrangement to form the tower structure 500. In addition, as is described herein, the tower structure 500 may be formed using at least one cementitious material.

As depicted in the partial overhead view of the tower structure 500 illustrated in FIG. 6, the wall 502 may, in an embodiment, have an outer circumferential surface 508. The outer circumferential surface 508 may have a maximal radial distance from the vertical axis ($V_A$). The outer circumferential surface 508 may, for example, be generally circular and circumscribing the vertical axis ($V_A$).

In an embodiment, the wall 502 may have an inner circumferential surface 510. The inner circumferential surface 510 may have a minimal radial distance from the vertical axis. The inner circumferential surface 510 may, for example, be generally circular, and circumscribing the vertical axis. Further, as shown, FIG. 6 illustrates an embodiment of a reinforcement member 514 may be positioned on the first printed layer 512.

FIG. 6, therefore, illustrates the process of forming the tower structure 500 following placement and/or positioning of the reinforcement member 514 on the first printed layer 512. FIG. 6 also illustrates a portion of the second printed layer 516 being deposited on the reinforcement member 514, at the deposition footprint 336, via a printhead 318 of the printhead assembly 302 of the additive printing device 300. The additive printing device 300 is described in more detail herein in reference to FIGS. 14 and 16.

As particularly depicted in FIGS. 6 and 7, in an embodiment, a midline reference curve ($C_M$) may be defined for each layer of the tower structure 500. The midline reference curve ($C_M$) may be equidistant between the outer circumferential surface 508 and the inner circumferential surface 510. Accordingly, the midline reference curve ($C_M$) may at least partially circumscribe the vertical axis ($V_A$). It should be appreciated that the midline reference curve ($C_M$) may also be referred to herein as a neutral axis.

Referring still to FIG. 6, in an embodiment, the additive printing device 300 may also include a support structure 304. The support structure 304 may extend from the ground and/or from the support surface 2 along a generally vertical direction (V). In an embodiment, the support structure 304 may include at least one vertical support component 306. As depicted, in an embodiment, the vertical support component(s) 306 may be located radially outward of the tower structure 500. However, in an additional embodiment, the vertical support component(s) 306 may be located radially inward of the wall 502 or supported above and over the wall (as shown in the embodiment of FIGS. 3-5, for example).

The vertical support component(s) 306 may, in an embodiment, support a horizontal support component 308. The vertical support component(s) 306 and the horizontal support component 308 may, in an embodiment, be a truss-like structure. However, the vertical support component(s) 306 and the horizontal support component 308 may be formed in the other suitable manner or have any other configuration according to alternative embodiments. The horizontal support component 308 may, in an embodiment, be rotatable about the vertical support component(s) 306. In an additional embodiment, the horizontal support component 308 may be movably coupled to the vertical support component(s) 306 so as to permit the horizontal support component 308 to move in the vertical direction (V).

As particularly depicted in FIG. 7, in an embodiment, the vertical support component(s) 306 may be configured to have a height that increases in step with the tower structure 500 during the manufacturing thereof. In such an embodiment, additional segments may be combined with the vertical support component(s) 306 to raise the vertical support structure using a jacking system (for example, similar to that shown in the embodiment of FIGS. 3-5). In general, the jacking system may be positioned proximate the support surface 2 and may be configured for raising the vertical support component(s) 306 and inserting additional segments.

The support structure 304 may be configured to support at least one support arm 310 movably coupled thereto. The support arm(s) 310 may be configured to position at least one component of the additive printing device 300 adjacent to the tower structure 500. The support arm(s) 310 may also be configured to deliver power, air, cementitious material, form material, or other resources to the supported component. In an embodiment, the support arm(s) 310 and/or the additive printing device 300 may also be equipped with at least one optical sensor for detecting a position of the support arm(s) 310 and/or the additive printing device 300 relative to the tower structure 500.

The additive printing device 300 may include the printhead assembly 302 supported by the support structure 304. The printhead assembly 302 and therefore the printhead 318 may be positioned over the support surface 2 or preceding layers of the wall 502 by at least one of the horizontal support component 308 and/or the support arm(s) 310. Further, the printhead 318 may be controlled by a controller, such as controller 200, and may be configured to direct and/or shape a flow of cementitious material during the additive printing of the tower structure 500.

Figure 8:
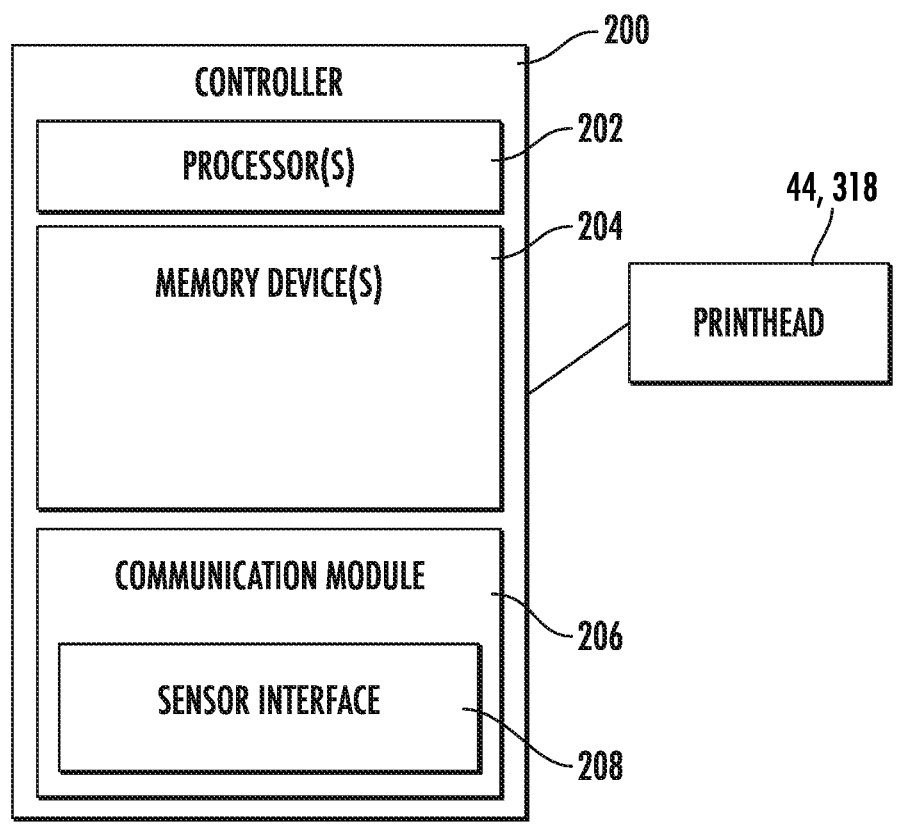
FIG. 8 illustrates a block diagram of an embodiment of a controller of an additive printing device according to the present disclosure.

Referring now to FIG. 8, a schematic diagram of an embodiment of suitable components of the controller 200 that may control the additive printing devices 40, 300 according to the present disclosure is illustrated. For example, as shown, the controller 200 may include one or more processor(s) 202 and associated memory device(s) 204 configured to perform a variety of computer-implemented functions (e.g., performing the methods, steps, calculations and the like and storing relevant data as disclosed herein). In an embodiment, the processor 202 may be configured to compute advanced control algorithms and communicate to a variety of Ethernet or serial-based protocols (Modbus, OPC, CAN, etc.). Additionally, the controller 200 may also include a communications module 206 to facilitate communications between the controller 200 and the various components of the additive printing devices 40, 300. Further, the communications module 206 may include a sensor interface 208 (e.g., one or more analog-to-digital converters) to permit signals transmitted from one or more sensors to be converted into signals that can be understood and processed by the processors 202. It should be appreciated that the sensor(s) may be communicatively coupled to the communications module 206 using any suitable means, such as a wired or a wireless connection. Additionally, the communications module 206 may also be operably coupled to a component of the additive printing device s 40, 300 so as to orchestrate the formation of the tower structure 500.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 204 may generally be configured to store suitable computer-readable instructions that, when implemented by the processor(s) 202, configure the controller 200 to perform various functions including, but not limited to, manufacturing a tower structure, as described herein, as well as various other suitable computer-implemented functions.

Figure 9:
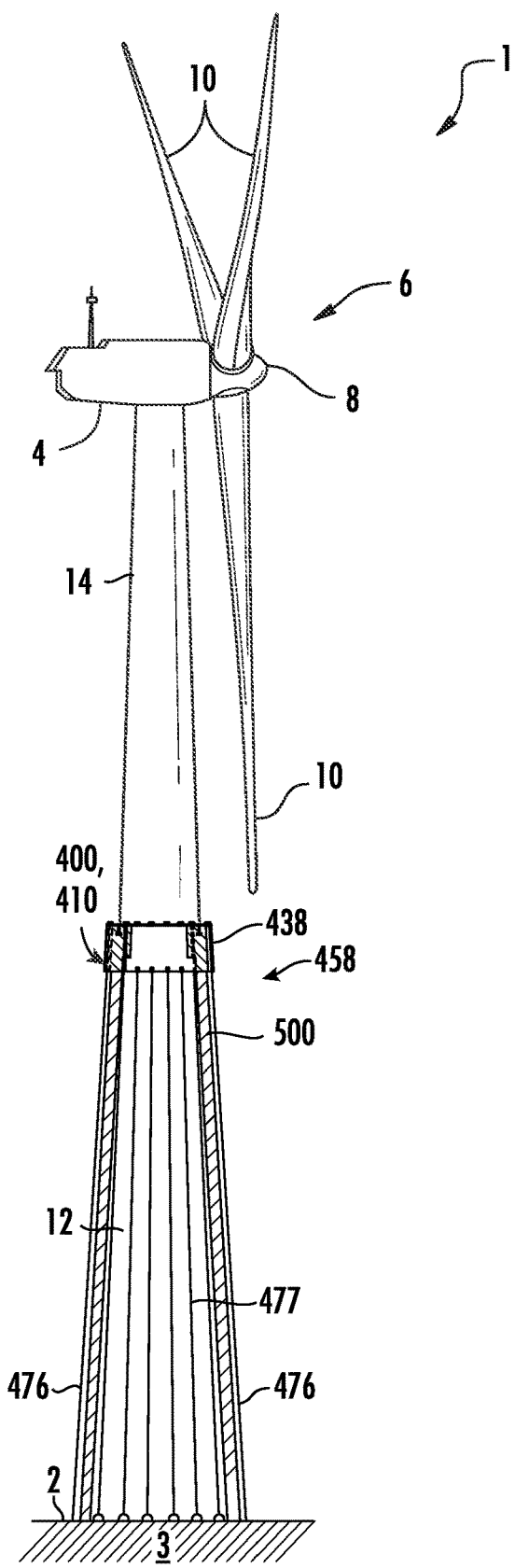
FIG. 9 illustrates a partial cross-sectional view of an embodiment of a wind turbine having a transition assembly and at least one tower section according to the present disclosure.
Figure 10:
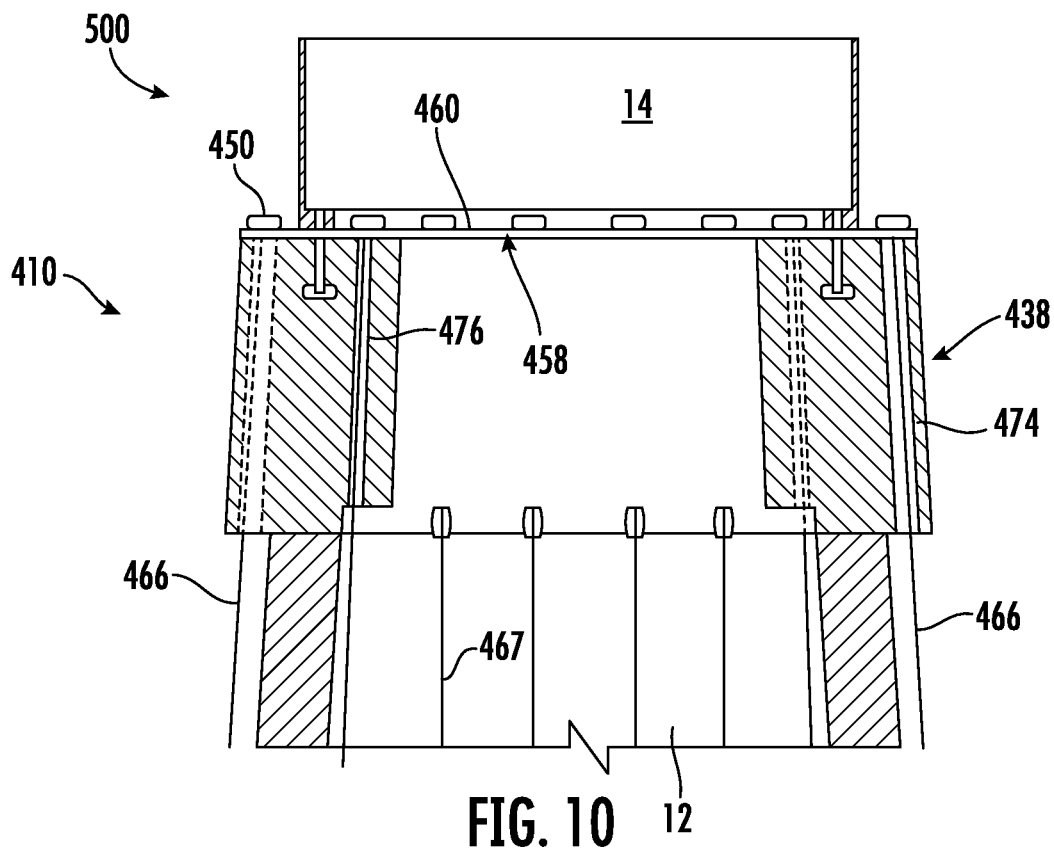
FIG. 10 illustrates a cross-sectional view of the tower structure of FIG. 10 according to the present disclosure, particularly illustrating a transition assembly of the tower structure.

Referring now to FIGS. 9-10, various views of an embodiment of a hybrid tower structure 500 of the wind turbine 1 according to the present disclosure are illustrated. FIG. 9 illustrates a perspective view of the wind turbine 1 having the tower structure 500 with a transition assembly 410 as shown in cross-section according to the present disclosure. FIG. 10 illustrates a partial, cross sectional-view of the tower structure 500 at the transition assembly 410 according to the present disclosure. Furthermore, as shown in FIG. 9, the tower structure 500 includes a lower tower section 12 that may be additively manufactured as described herein and upper tower section 14 formed using conventional means. For example, in an embodiment, the upper tower section 14 may be a steel cylindrical or lattice-frame structure, or may also be additively manufactured. The upper tower section 14a also includes a base 400 configured as a transition assembly 410 and the upper tower sections 12 is stacked atop the lower tower section 14. In another embodiment, the transition assembly 410 is separate from the upper tower section 12 (i.e., the upper tower section 12 does not have a base 400) and the transition assembly 410, as a separate component from the upper tower section 12, connects the upper tower section 14 to the lower tower section 12. In either embodiment, the transition assembly 410 connects with the lower tower section 14 in a manner that effectively manages and distributes the loads and forces, particularly, the compressive forces and structural loads, translated to the lower tower section 12.

Figures 11A, 11B:
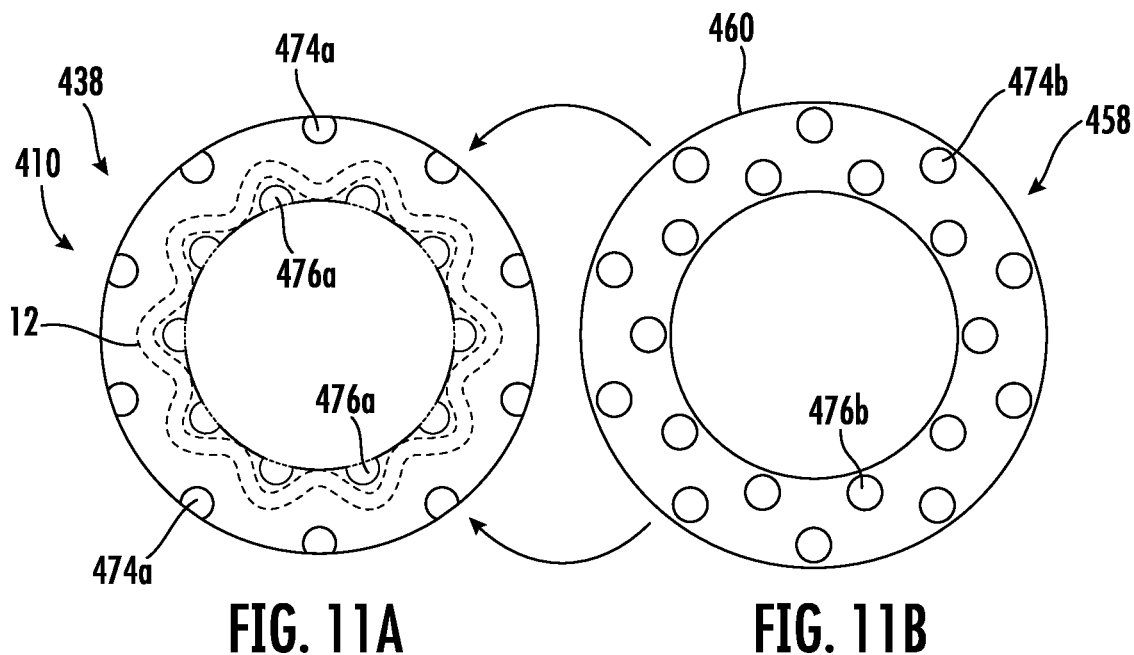
FIG. 11A illustrates a top view of the transition assembly of the tower structure of FIG. 10 according to the present disclosure.
FIG. 11B illustrates a top view of a reinforcement member of the transition assembly of the tower structure of FIG. 10 according to the present disclosure.

In particular, as shown in FIGS. 9, 10, 11A, and 11B, the transition assembly 410 may include a wall component 438 and one or more reinforcement elements 458. For example, one or more of the reinforcement elements 458 may be arranged between adjacent stacked tower sections, in particular, between the lower tower section 12 and the upper tower section 14. More specifically, FIG. 11A illustrates a top view of the transition assembly 410 according to the present disclosure. Thus, as shown, the wall component 438 of the transition assembly 410 may define one or more outer channels 474a and one or more inner channels 476a. FIG. 11B illustrates a top view of an embodiment of the reinforcement element 458 of the transition assembly 410 according to the present disclosure.

In an embodiment, for example, as shown in FIGS. 10, 11A, and 11B, one or more of the reinforcement elements 458 may be a plate member 460. More specifically, as shown in FIG. 11B, the plate member 460 may have one or more outer channels 474b and one or more inner channels 476b corresponding to or aligning with the outer channel(s) 474a and the inner channel(s) 476a of the wall component 438 of the transition assembly 410. In further embodiments, as shown in FIG. 10, the reinforcement element(s) 458 may include one or more reinforcement bars or tendons 466, 467, which may be configured as external tensioning tendons 466 and internal tensioning tendons 467. Referring still to FIGS. 9-11B, the plate member 460 may be positioned between the wall component 438 and the upper tower section 14 such that the outer and inner channels 474a, 476a of the transition assembly 410 are aligned with the outer and inner channels 474b, 476b of the reinforcement element 458.

Accordingly, in such embodiments, the external and internal tensioning tendons 466, 467 may extend through outer and inner channels 474, 476 of the wall component 438, respectively, and/or through the reinforcement element 458 of the transition assembly 410. The channels defined herein may be, for example, through holes. Moreover, as shown in FIGS. 9 and 10, the external and internal tensioning tendons 466, 467 may be anchored to the wall component 438 via one or more fasteners 450 and to the support surface 2. Thus, in an embodiment, the internal tensioning tendons 467 extend through the inner channels 476 and then extend within the recesses (described in detail herein) of the lower tower section 12 and are anchored to the support surface 2 at locations inside of the tower structure 500.

Figure 12:
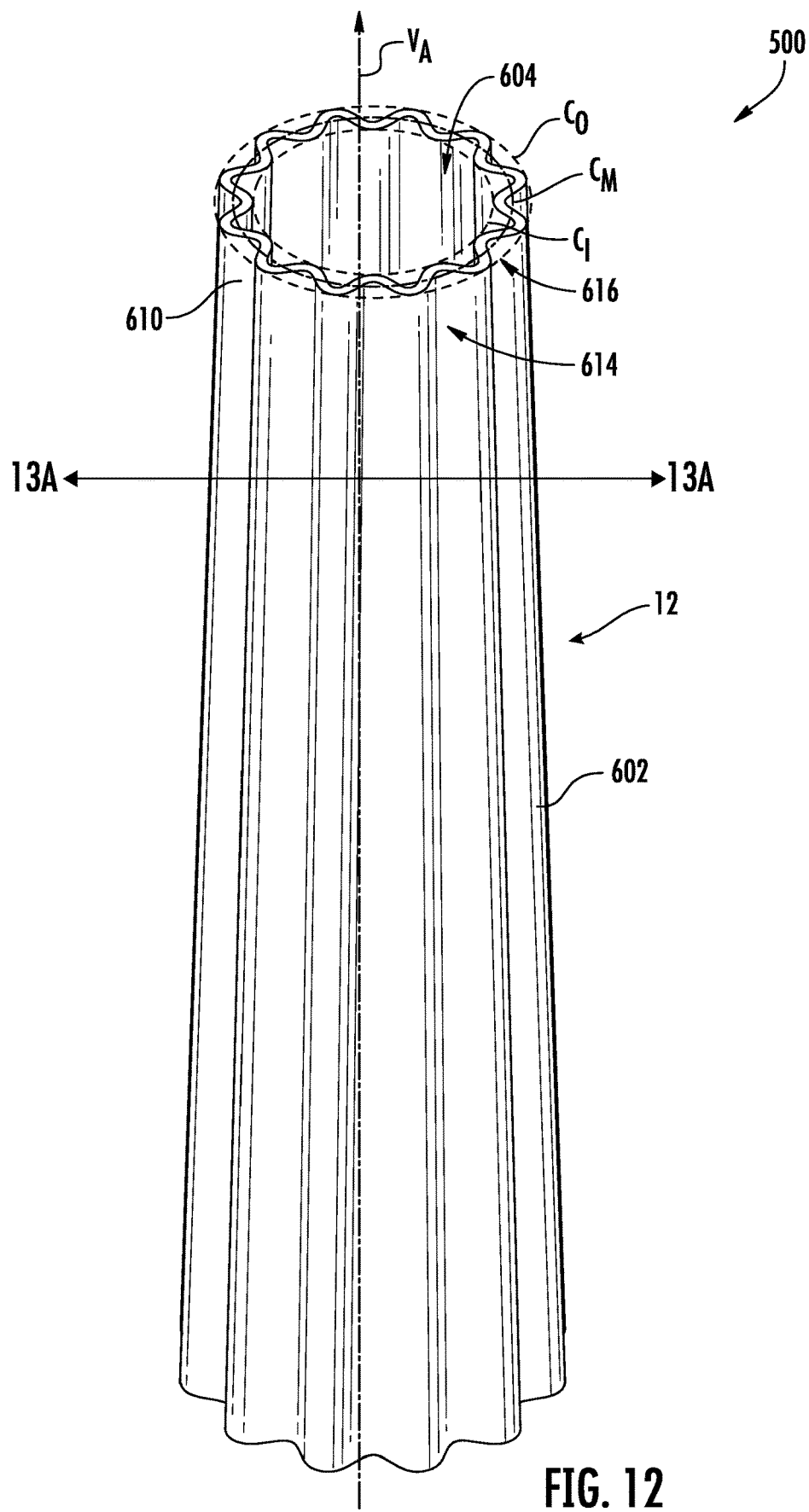
FIG. 12 illustrates a perspective view of an embodiment of a tower section having a wall element according to the present disclosure.
Figure 13A:
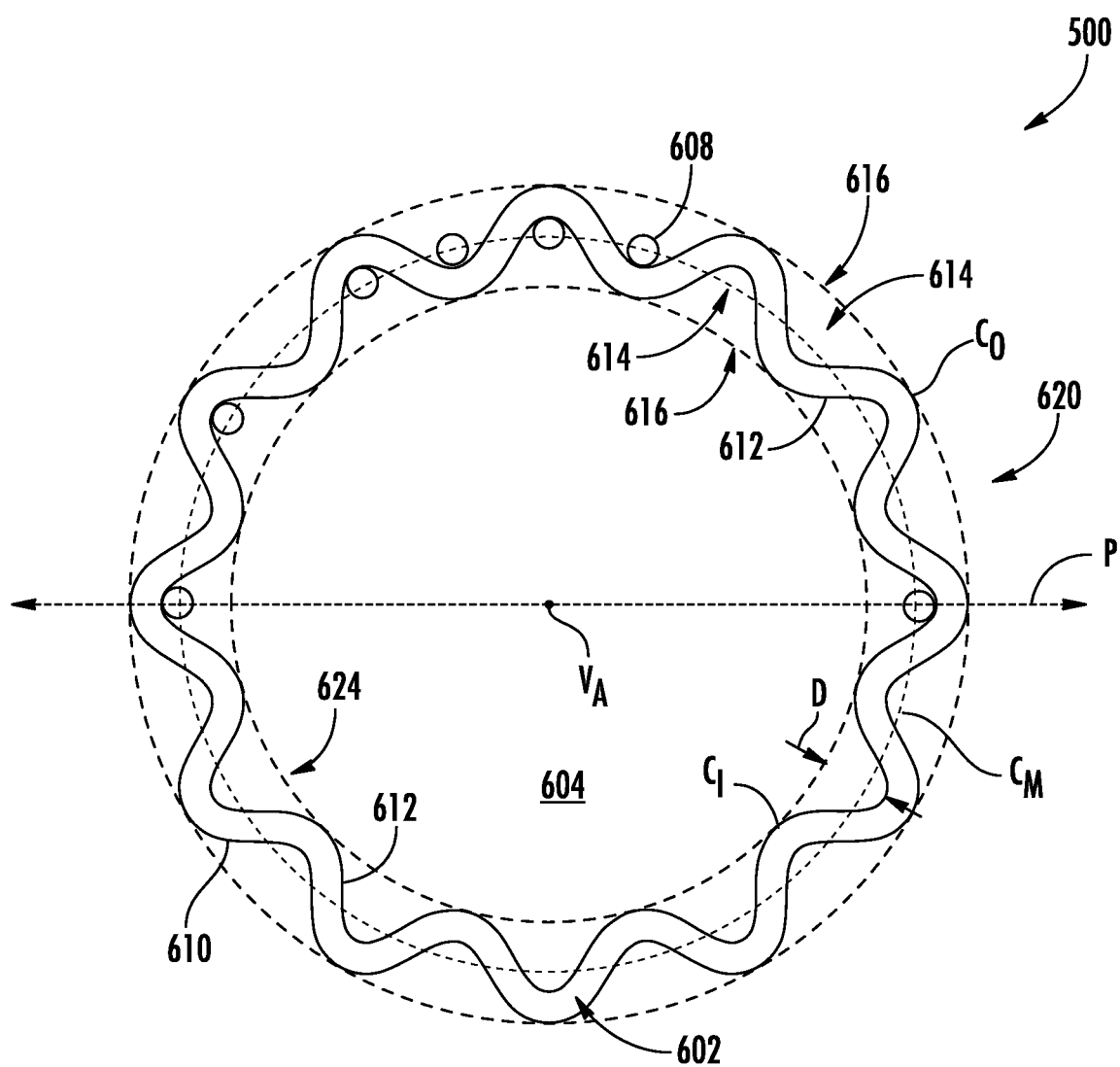
FIG. 13A illustrates a cross-sectional view of the tower section of FIG. 12 along section line 13A-13A, particularly illustrating a layer of the wall element of the tower section according to the present disclosure.
Figure 13B:
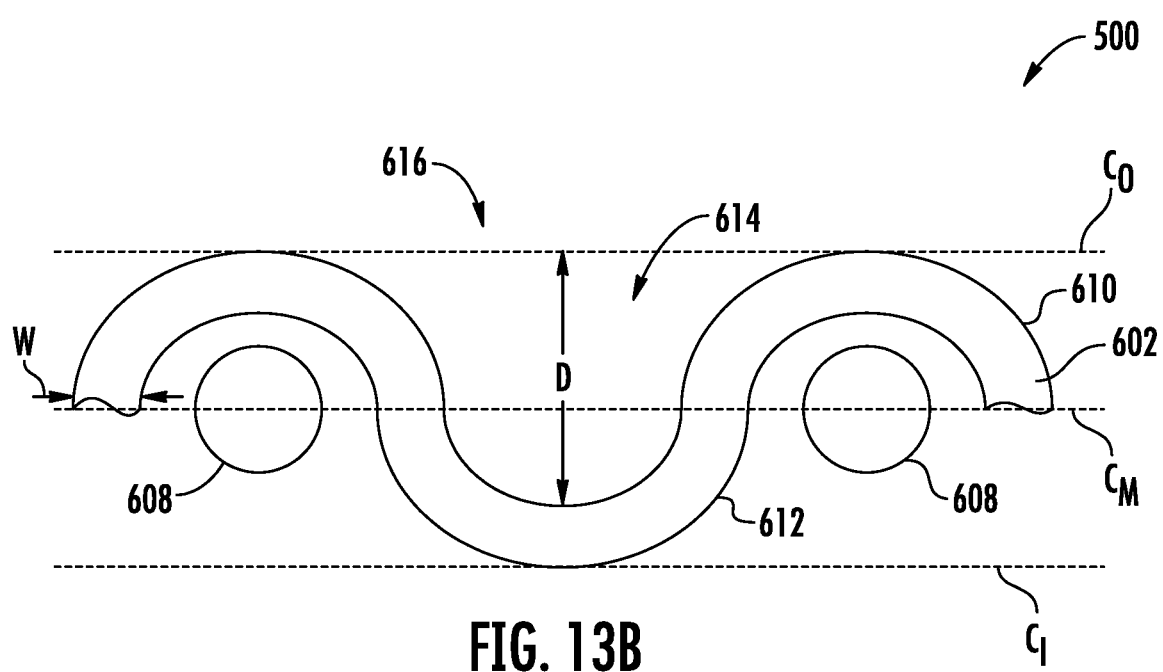
FIG. 13B illustrates a simplified, partial, schematic view of a layer of the wall element of FIG. 12 according to the present disclosure.
Figure 14:
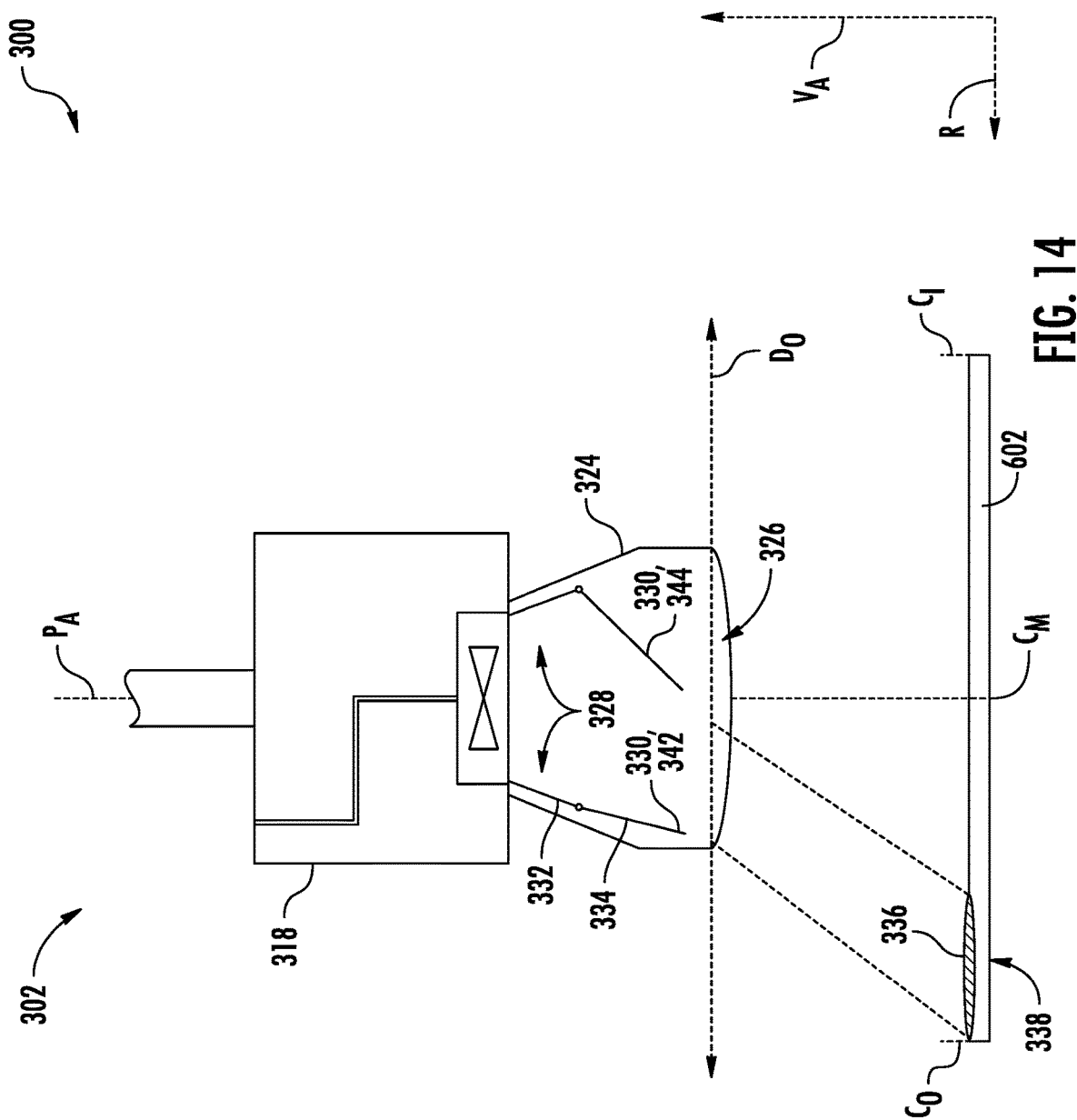
FIG. 14 illustrates a simplified, schematic view of an embodiment of a printhead assembly of an additive printing device for additively manufacturing a tower structure according to the present disclosure.
Figure 15:
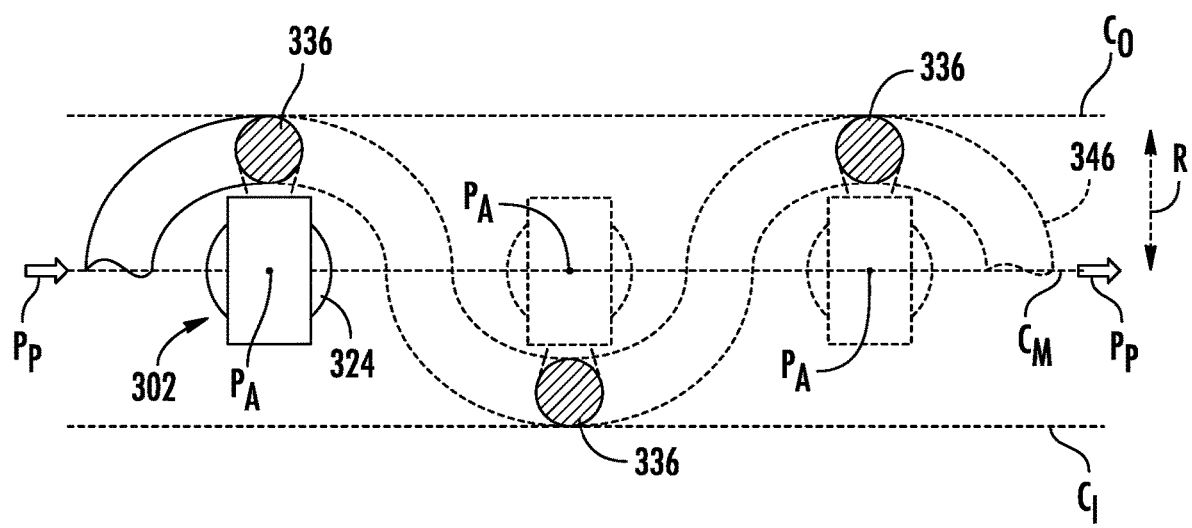
FIG. 15 illustrates a simplified, partial, top view of a deposition path for the additive manufacturing of a layer of the wall element of FIG. 12 according to the present disclosure.

Referring now to FIGS. 12-15, various views of an embodiment of a tower section of a tower structure of a wind turbine and an additive printing device for forming the same are illustrated. FIG. 12 illustrates a perspective view of an embodiment of the lower tower section 12 having a wall element 602 formed of one or more printed layers according to the present disclosure. FIG. 13A illustrates a cross-sectional view of the lower tower section 12 along the section line 13A-13A according to the present disclosure, particularly illustrating a layer of the wall element 602 and the reinforcement members 608. FIG. 13B illustrates a simplified, partial view of an embodiment of another layer of the wall element 602 according to the present disclosure. FIG. 14 illustrates a simplified, schematic view of an embodiment of the printhead assembly 302 of the additive printing device 300 according to the present disclosure. FIG. 15 illustrates a simplified, partial view of a deposition path 346 of the additive printing device 300 according to the present disclosure2.

More specifically, in the illustrated embodiment, as shown in FIGS. 12 and 13A, the wall element 602 circumscribes a vertical axis ($V_A$) of the tower structure 500. Furthermore, in an embodiment, the wall element 602 generally has an outer circumferential surface 610 and an inner circumferential surface 612 and defines a hollow interior 604. Moreover, as shown, each layer of the tower structure 500 has an outer reference curve ($C_O$) and an inner reference curve ($C_I$). The outer reference curve ($C_O$) is tangential to a portion of the outer circumferential surface 610 having a maximal radial distance from the vertical axis ($V_A$). In an embodiment, the outer reference curve ($C_O$) may be generally circular and may circumscribe the vertical axis ($V_A$), and the radial distance may be a distance in the radial direction (R) (see e.g., FIG. 14). Moreover, the inner reference curve ($C_I$) is tangential to a portion of the inner circumferential surface 612 having a minimal radial distance from the vertical axis ($V_A$). In an embodiment, the inner reference curve ($C_I$) may also be generally circular and circumscribe the vertical axis ($V_A$).

Further, as shown, each layer of the tower structure 500 also has a midline reference curve ($C_M$). The midline reference curve ($C_M$) is equidistant between the outer reference curve ($C_O$) and the inner reference curve ($C_I$) for the layer. In an embodiment, the midline reference curve ($C_M$) may be generally circular, circumscribing the vertical axis ($V_A$). In the illustrated embodiment, the midline reference curve ($C_M$) is generally referred to herein as a neutral axis. For example, if a force from the reinforcement member(s) 608, e.g., the tensioning tendons 466, 467, is applied at the midline reference curve ($C_M$), then the resulting compressive load will not generate an unbalanced moment within the wall element 602. In other words, the load(s) developed radially across the wall element 602 by the reinforcement members 608 are closer to equilibrium when the reinforcement members are positioned at or near the neutral axis of the wall element 602. In the illustrated embodiment, the neutral axis happens to correspond to the midline reference curve ($C_M$). In another embodiment, the midline reference curve ($C_M$) and/or the neutral axis at any one point in a cross section of the wall element 602 may be situated at a different location than that illustrated in FIGS. 12-13 and 15.

Still referring to FIGS. 12-15, particularly FIGS. 13A and 13B, the wall element 602 may define at least one recess 614 in order to facilitate positioning of the reinforcement member(s) 608 at or near the neutral axis. In such embodiments, the recess(es) 614 have at least one circumferential opening 616 positioned along the outer reference curve ($C_O$). The recess(es) 614 may also have at least one circumferential opening 616 positioned along the inner reference curve ($C_I$). In certain embodiments, for example, the reinforcement member(s) 608 are placed entirely within the recess(es) 614 at the midline reference curve ($C_M$).

As shown particularly in FIG. 13A, the recess(es) 614 may have a depth (D) extending in a radial direction. The depth (D) intersects the midline reference curve ($C_M$). For example, the depth (D) extends radially outward from the inner reference curve ($C_I$). In such an embodiment, the depth (D) has a maximal radial distance from the vertical axis ($V_A$) which is greater than the radial distance between the vertical axis ($V_A$) and the midline reference curve ($C_M$). In another embodiment, the depth (D) may extend radially inward from the outer reference curve ($C_O$). In such an embodiment, the depth (D) may have a minimal radial distance from the vertical axis ($V_A$) which is less than the radial distance between the vertical axis ($V_A$) and the midline reference curve ($C_M$).

Returning to FIG. 13A, the wall element 602 may include a first plurality of recesses 620 and a second plurality of recesses 624. In particular, as shown, the first plurality of recesses 620 is distributed circumferentially about the vertical axis ($V_A$). The first plurality of recesses 620 included twelve recesses 614 distributed equidistantly along the outer reference curve ($C_O$). The first plurality recesses 620 is distributed about the outer reference curve ($C_O$), and the depth (D) of each recess 614 extends in a radial direction to a point inward of the midline reference curve ($C_M$) and outward of the inner reference curve ($C_I$). Moreover, as shown, the second plurality of recesses 624 is distributed circumferentially about the vertical axis ($V_A$). Furthermore, as shown, the second plurality of recesses 624 may be circumferentially offset from the first plurality of recesses 620, and the circumferential offset of the second plurality of recesses 624 relative to the first plurality of recesses 620 defines the wall element 602 as a continuously undulating form circumscribing the vertical axis ($V_A$). In another embodiment, the wall element 602 includes either the first plurality of recesses 620 or the second plurality of recesses 624. In another embodiment, the distance between the inner circumferential surface 612 and the outer circumferential surface 610 (e.g. the width (W)) may vary for one or more layers.

Referring still to FIGS. 12-15, at least one reinforcement member 608 may be situated in one or more of the recesses, such as one or more of the first plurality of recesses 620 and/or the second plurality of recesses 624. In an embodiment, as shown, the reinforcement member(s) 608 may be positioned adjacent to or in line with the neutral axis of the wall element 602 (i.e., the midline reference curve ($C_M$)). Additionally, one or more of the reinforcement member(s) 608 may be positioned on a plane (P) which is generally parallel to the vertical axis ($V_A$).

As particularly illustrated in FIG. 14, the tower structure 500 is additively manufactured, at least in part, via the additive printing device 300. Notably, all or part of the tower structure 500, in particular, the wall element(s) 602, may be printed layer-by-layer, using the additive printing device 300. The additive printing device 300 includes the printhead assembly 302 having the printhead 318 that defines a printhead axis (PA). Further, as shown, the printhead 318 has a dynamic deposition nozzle 324 defining a deposition orifice 326 as a point of extrusion of material from the printhead 318.

More specifically, as shown, the printhead 318 may include a translatable flow-directing element 328 positioned at least partially within the deposition nozzle 324. Furthermore, in the illustrated embodiment of FIGS. 14 and 15, the dynamic deposition nozzle 324 may print and deposit material along a deposition footprint 336 (FIG. 14) and a deposition path 346 (FIG. 15). In such embodiments, the deposition footprint 336 may remain unaltered during printing and depositing, whereas the deposition path 346 may be altered.

For example, referring still to FIG. 14, the translatable flow-directing element 328 is configured to change the shape of the deposition nozzle 324 in order to alter the deposition path 346. For example, as shown in FIG. 15, the flow of the material through the deposition nozzle 324 may follow a nominal print path ($P_P$) when the shape of the deposition nozzle 324 is unaltered. However, in an embodiment, the translatable flow-directing element 328 may change the shape of the deposition nozzle 324 and, therefore, the position of the deposition footprint 336, resulting in the deposition path 346. In this way, the flow of the material deviates from the nominal print path ($P_P$) even though the printhead assembly 302 is maintained in its fixed orientation (e.g., orthogonal to the printhead axis (PA)) positioned over and aligned with the nominal print path ($P_P$). It should be appreciated that, in an embodiment, the translatable flow-directing element 328 may be integrally formed with the deposition nozzle 324.

Returning to the illustrated embodiment of FIG. 14, the translatable flow-directing element 328 may include a plurality of moveable panels 330 for adjusting the flow of material from the deposition nozzle 324. In such embodiments, each the plurality of panels 330 includes a fixed portion 332 and at least one movable portion 334 movably coupled thereto. A hinge, a pivot, and/or a flexible portion may be disposed between each fixed portion 332 and the corresponding movable portion(s) 334 disposed between.

Further, as shown, the plurality of panels 330 of the translatable flow-directing element 328 may include an outer flap 342 positioned radially outward of the midline reference curve ($C_M$). Additionally, the plurality of panels 330 include an inner flap 344 positioned radially inward of the midline reference curve ($C_M$). In an embodiment, the positioning of the inner and outer panels 344, 342 may be synchronized. As used herein, the term "panel" generally refers to a plate-like structure, such as plates, vanes, inflatable elements, bimetallic strips, and/or other similar structures configured to direct the deposition of material via the alteration of the interior shape of the deposition nozzle 324. In another embodiment, the plurality of panels 330 may be formed from a metal, a plastic, and/or a composite.

More specifically, and still referring to FIG. 14, at least one of the inner and outer panels 344, 342 is adjusted to develop a change in the position of the deposition footprint 336 at a first position along the deposition path 346 relative to a second position along the deposition path 346. In such an embodiment, the flow rate of the material being deposited may be affected to ensure a volume of the material of the deposition footprint 336 has a constant magnitude along the entirety of the deposition path 346. By affecting the flow rate of the material being deposited, the volume of the material of each deposition footprint 336 may have constant magnitude regardless of the cross-sectional area of the deposition path 346.

Figure 16:
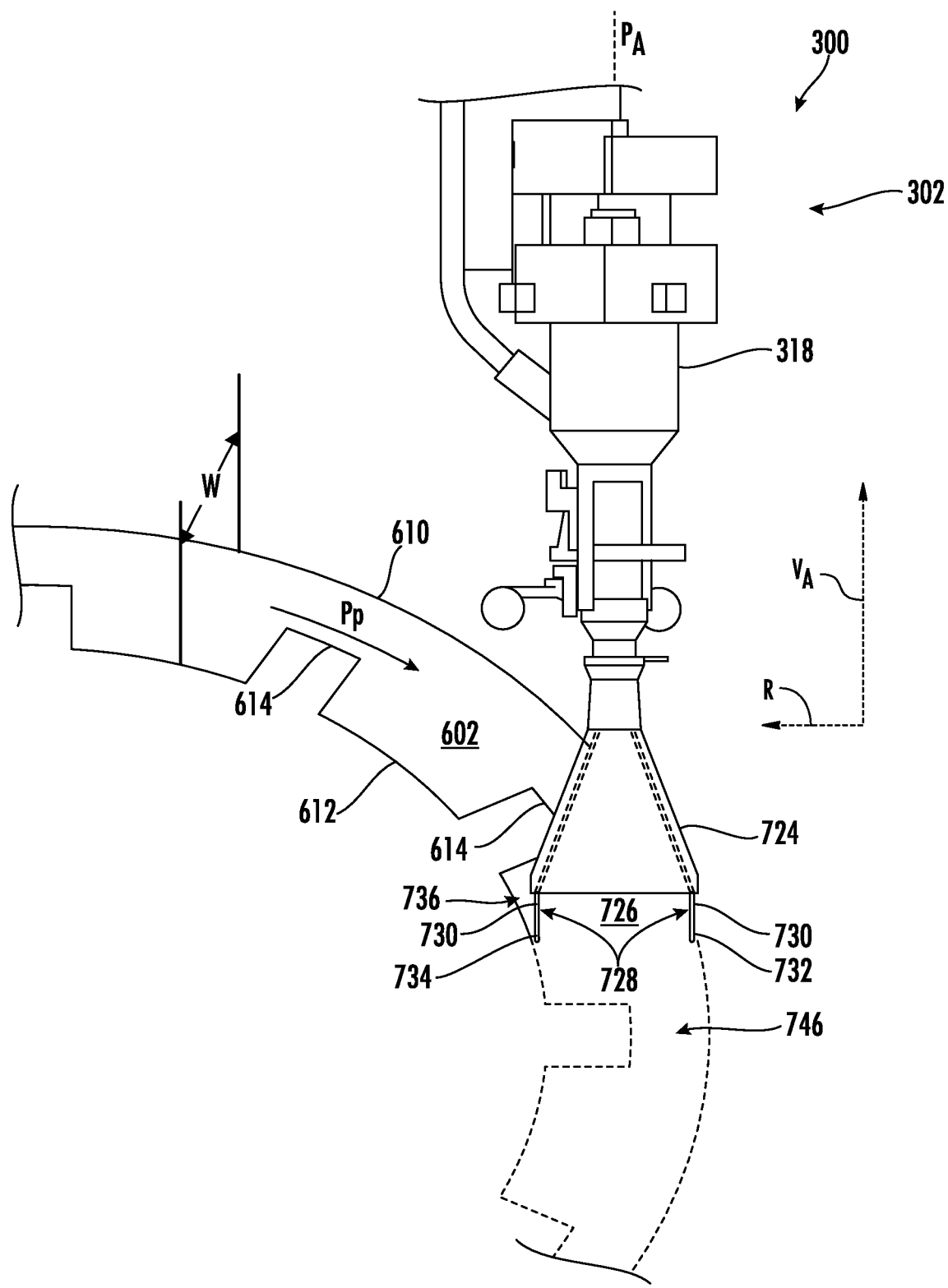
FIG. 16 illustrates a perspective view of an embodiment of a variable-width deposition nozzle of a printhead assembly of an additive printing device for additively manufacturing a tower structure according to the present disclosure.

Referring now to FIG. 16, a perspective view of an embodiment of an additive printing device 300 having a printhead assembly 302 with a variable-width deposition nozzle 724 forming a portion of a wall element 602 is illustrated according to the present disclosure. Notably, the wall element 602 is printed and deposited via the variable-width deposition nozzle 724 of the additive printing device 300. The additive printing device 300 includes a printhead assembly 302 having a printhead 318 that defines a printhead axis (PA) that is parallel to a vertical axis ($V_A$). Further, as shown, the variable-width deposition nozzle 724 may have a translatable flow-directing element 728 integrally formed therewith.

More specifically, in the illustrated embodiment of FIG. 16, the translatable flow-directing element 728 defines a deposition orifice 726. The shape of the deposition orifice 726 and, therefore, the shape of the deposition footprint 736 can be adjusted via adjustment to the translatable flow-directing element 728, thereby resulting in changes to the shape of the deposition path 746.

Referring still to FIG. 16, the translatable flow-directing element 728 is configured to adjust the width of the variable-width deposition nozzle 724, so as to change the shape of the deposition footprint 736 and the deposition path 746, without necessitating a shift in the variable-width deposition nozzle 724 away from alignment with the print path ($P_P$). For example, the deposition footprint 736 may be a first shape when the width of the translatable flow-directing element 728 is unaltered, and may be a different, second shape (e.g., having a reduced width) when the translatable flow-directing element 728 is altered. However, in the illustrated embodiment of FIG. 16, the translatable flow-directing element 728 may be altered to change the width of the deposition footprint 736 and to change an orientation of the deposition orifice 726, which results in a change to the position of the deposition path 746 without necessitating a shift in the variable-width deposition nozzle 724 away from alignment with the print path ($P_P$).

More specifically, in the illustrated embodiment of FIG. 16, the translatable flow-directing element 728 may include one or more adjustable side walls 730. In such embodiments, as shown, one or more of the side walls 730 may include an outer side wall 732 and an inner side wall 734.

Moreover, as shown, the outer side wall 732 may be positioned radially outward of the midline reference curve ($C_M$), whereas, the inner side wall 734 may be positioned radially inward of the midline reference curve ($C_M$). Furthermore, in an embodiment, one or more of the inner or outer side walls may be fixed and one or more of the inner and outer side walls may be moveable. As such, in an embodiment, the positioning of the inner and outer side walls 732, 734 may be synchronized. In another embodiment, the inner side wall 734 or a portion thereof may be adjusted and the outer side wall 732 may remain fixed. The outer side wall 732 or a portion thereof may be adjusted and the inner side wall 734 may remain fixed.

Referring still to FIG. 16, at least one of the inner and outer side walls 732, 734 can be adjusted to change the shape of the deposition path 746, e.g., to develop a deviation in a width (W) of a deposition footprint 736 at a first position along a deposition path 746 relative to a second position along the deposition path 746. The width (W) is the distance between the inner circumferential surface 612 and the outer circumferential surface 610. It should be appreciated that a deviation in width (W) of the deposition footprint 736 allows for the formation of at least one recess 614 in the outer circumferential surface 610 and/or the inner circumferential surface 612 of the wall element 602.

In another embodiment, the recess(es) 614 may be sized to have a depth that extends to a point before, up to, or beyond the midline reference curve ($C_M$) of a wall element 602, and the depth may facilitate positioning at least a portion of a reinforcement member, such as a tensioning tendon, within the recess(es) 614 (FIG. 13A). By placing at least a portion of the reinforcement member within the recess 614, the reinforcement member may be situated at or near a neutral axis (the neutral axis(es) is/are along $C_M$ for the illustrated embodiment) of the wall element 602. Accordingly, compressive forces experienced by the wall element 602 of a tower structure 500 are more evenly distributed across the width (W) of the wall element 602 than is possible when the reinforcement member is displaced from the neutral axis.

Figure 17A:
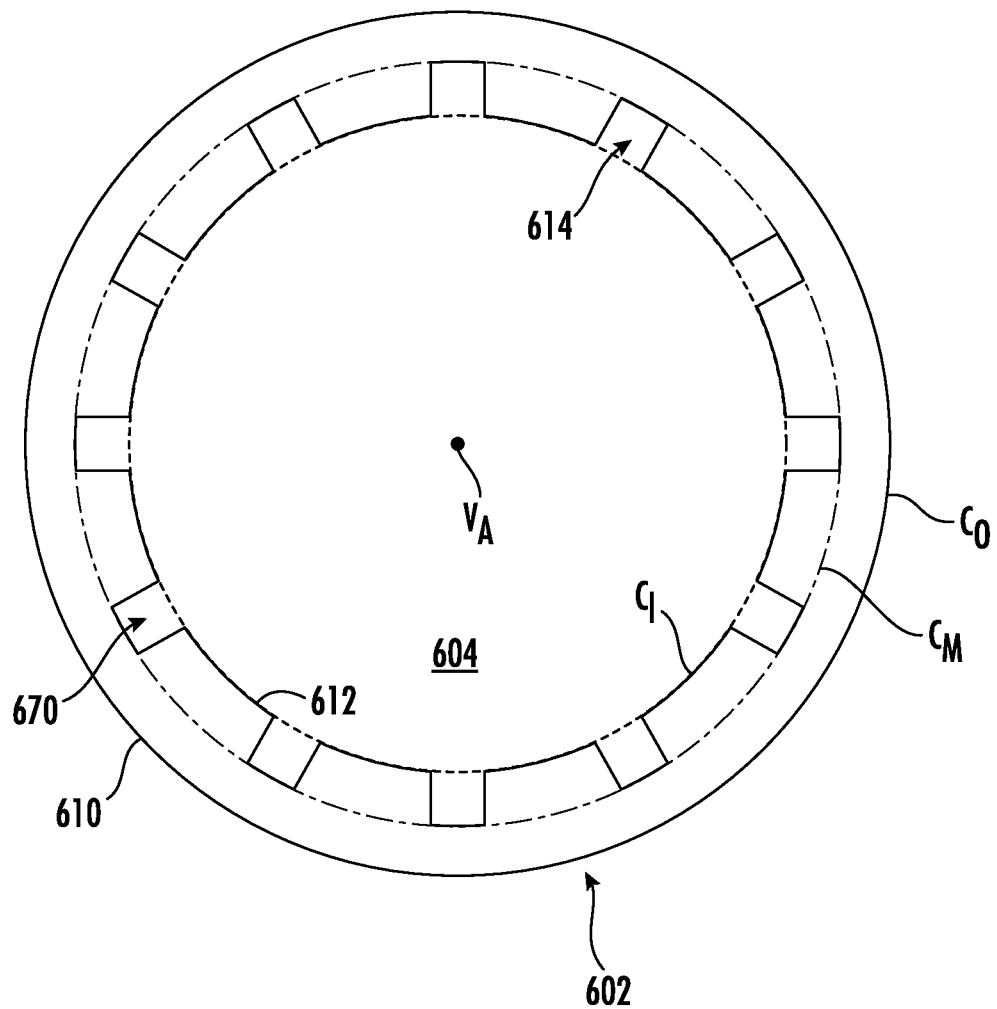
FIG. 17A illustrates a top view of an embodiment of a wall element defining at least one non-arcuate recess on the inner circumferential surface of the wall element according to the present disclosure.
Figure 17B:
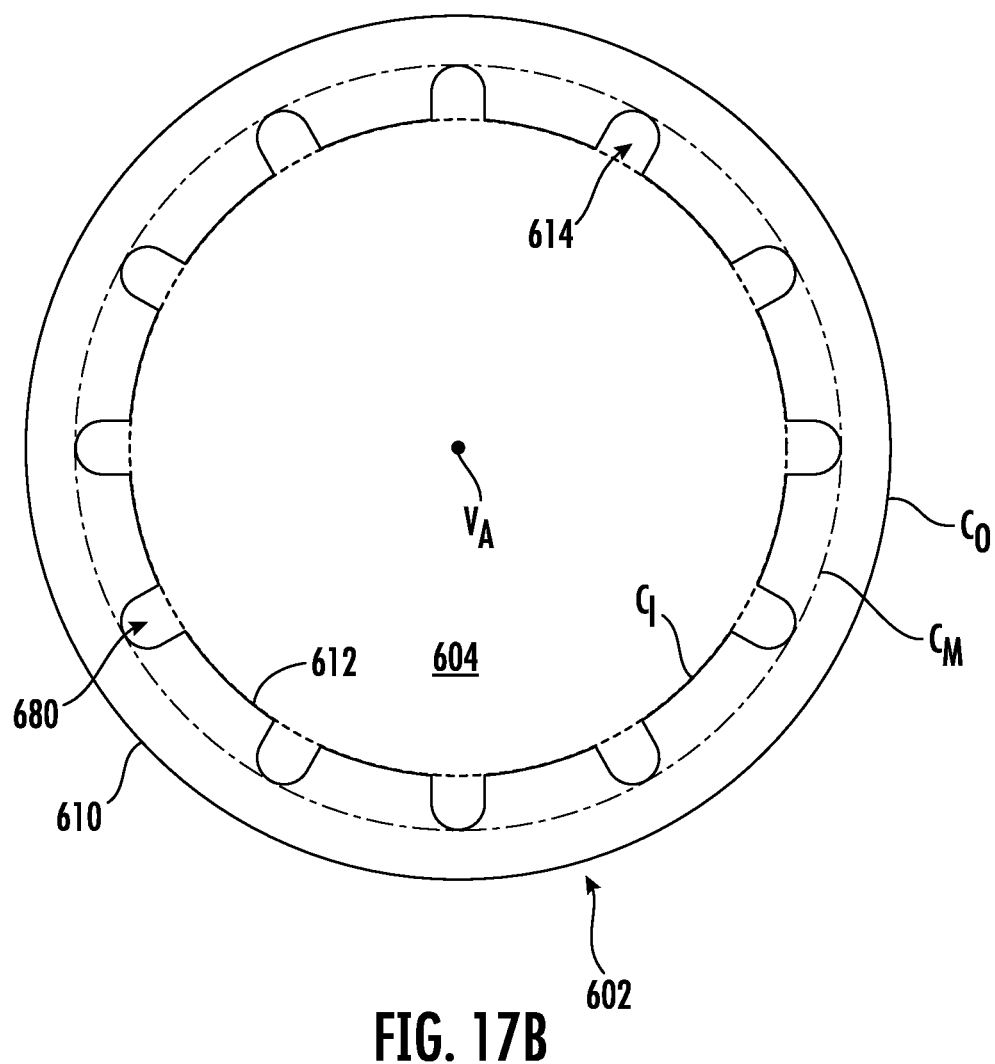
FIG. 17B illustrates a top view of an embodiment of a wall element defining at least one arcuate recess on the inner circumferential surface of the wall element according to the present disclosure.
Figure 17C:
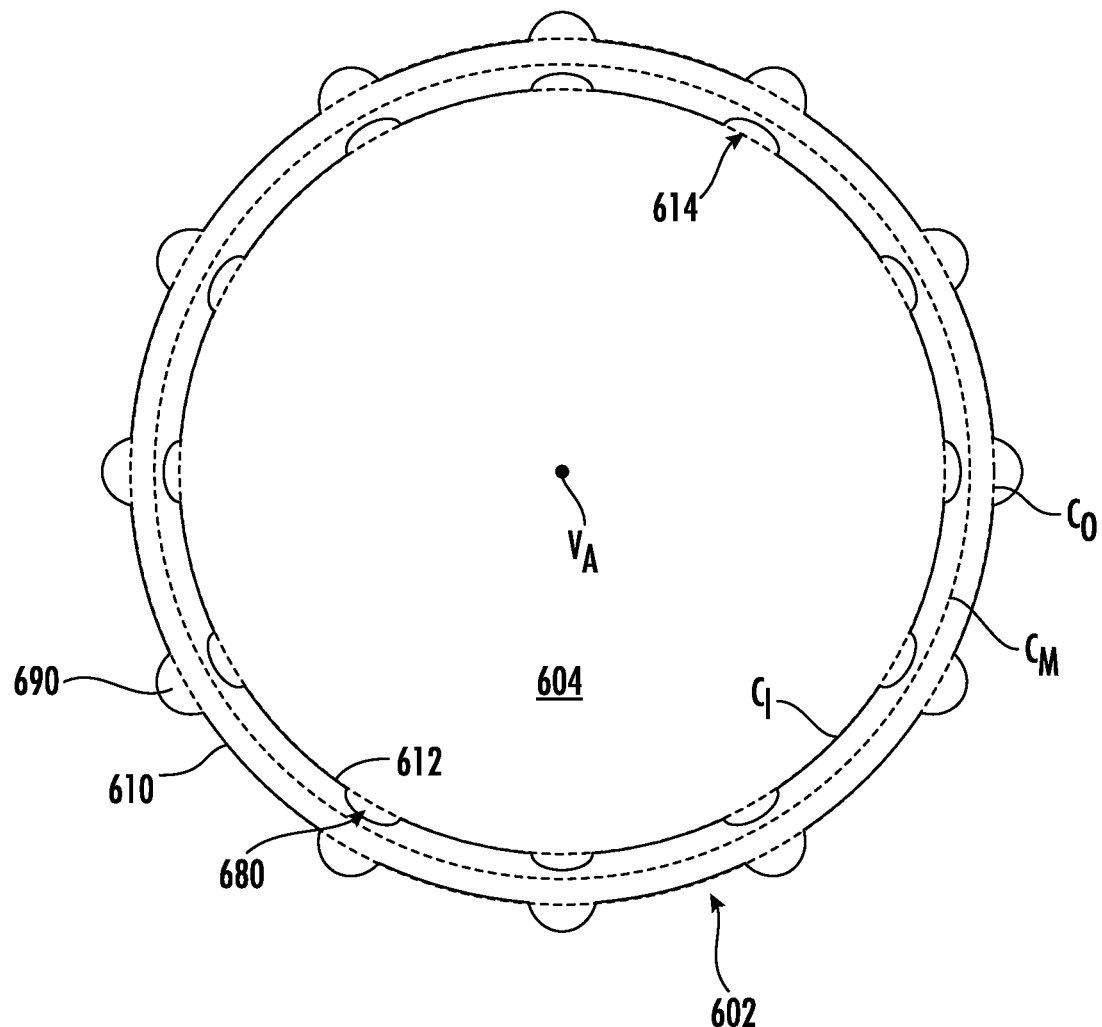
FIG. 17C illustrates a top view of an embodiment of a wall element defining at least one arcuate recess on the inner circumferential surface of the wall element and at least one protrusion on the outer circumferential surface according to the present disclosure.

Moreover, and as shown particularly in FIG. 17A-17C, the wall element 602 formed using the variable-width deposition nozzle 724 described herein may have any suitable configuration. For example, FIG. 17A illustrates a top view of an embodiment a layer of a wall element 602 having a plurality of recesses 614 formed therein, wherein each recess has a generally non-arcuate shape 670. FIG. 17B illustrates a top view of another embodiment a layer of a wall element 602 having a plurality of recesses 614 formed therein, wherein each recess 614 has a generally arcuate or curved shape 680. FIG. 17C illustrates a top view of yet another embodiment a layer of a wall element 602 having a plurality of recesses 614 formed on the inner circumferential surface 612, wherein the outer circumferential surface 610 also has a plurality of protrusions 690 formed thereon and aligning with the plurality of recesses 614. The embodiment of FIG. 17C may also be switched such that the plurality of recesses 614 are on the outer circumferential surface 610 and the protrusions are on the inner circumferential surface 612.

Figure 18A:
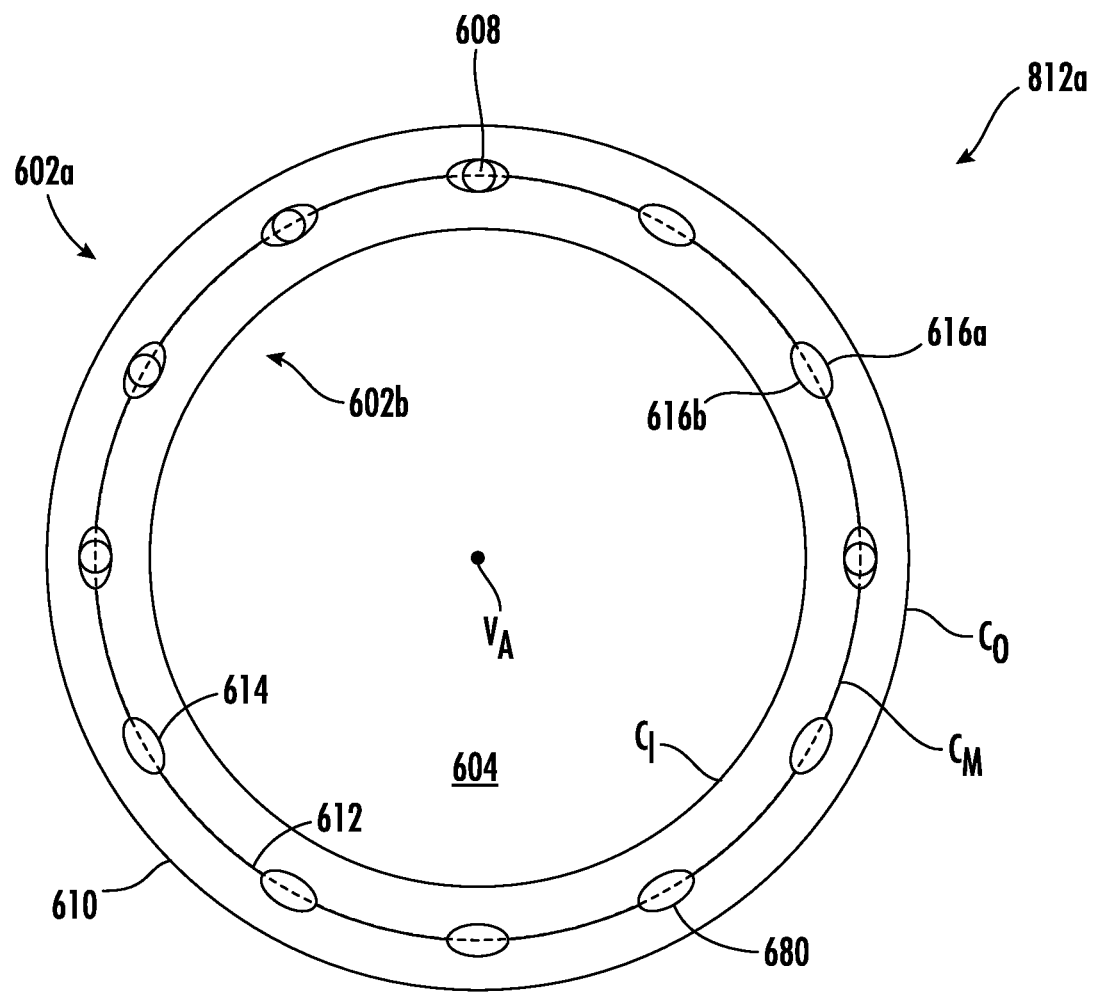
FIG. 18A illustrates a top view of an embodiment of a tower section, particularly illustrating adjacent wall elements according to the present disclosure.
Figure 18B:
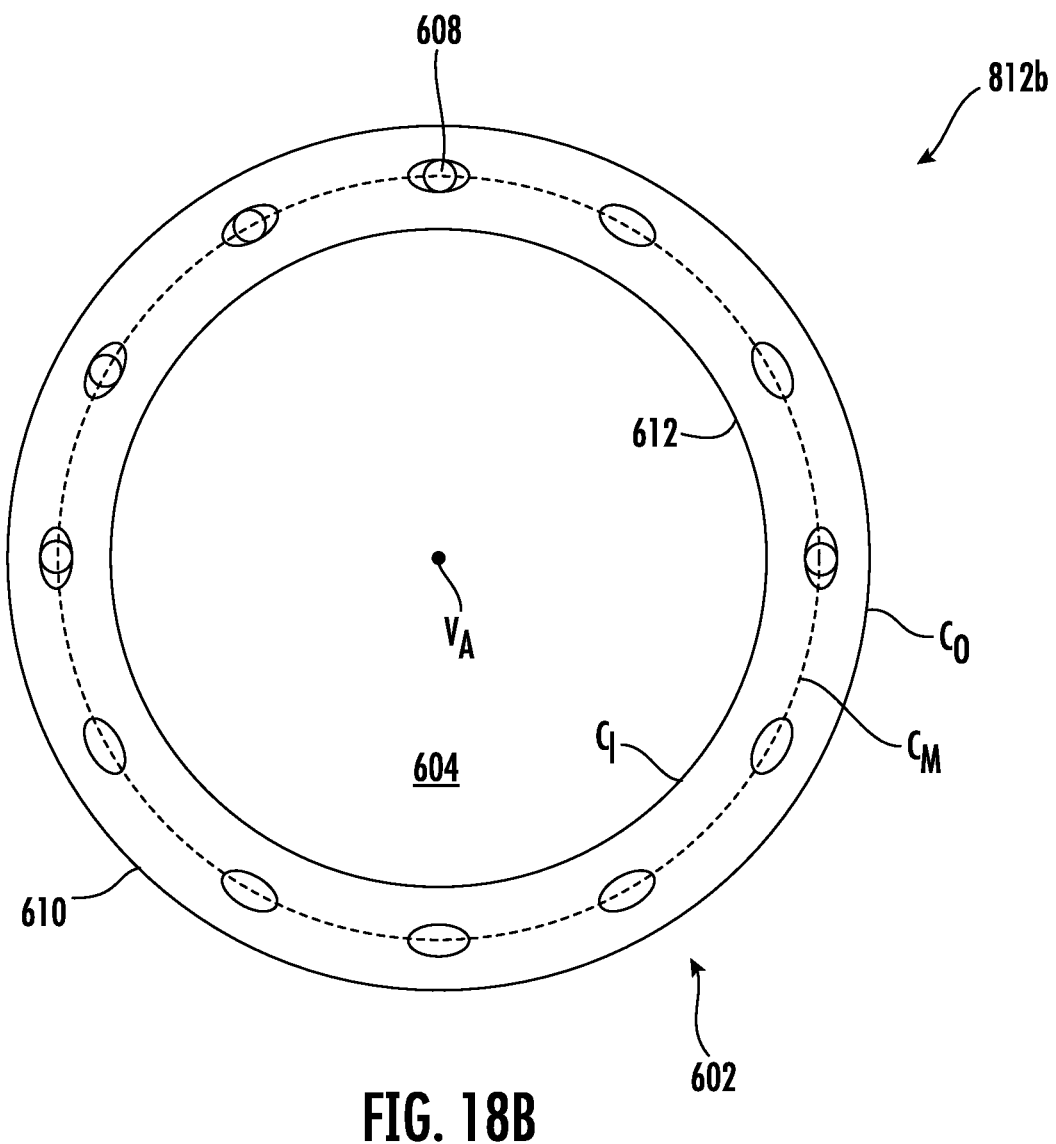
FIG. 18B illustrates a top view of an embodiment of a tower section, particularly illustrating only a single wall element according to the present disclosure.
Figure 19:
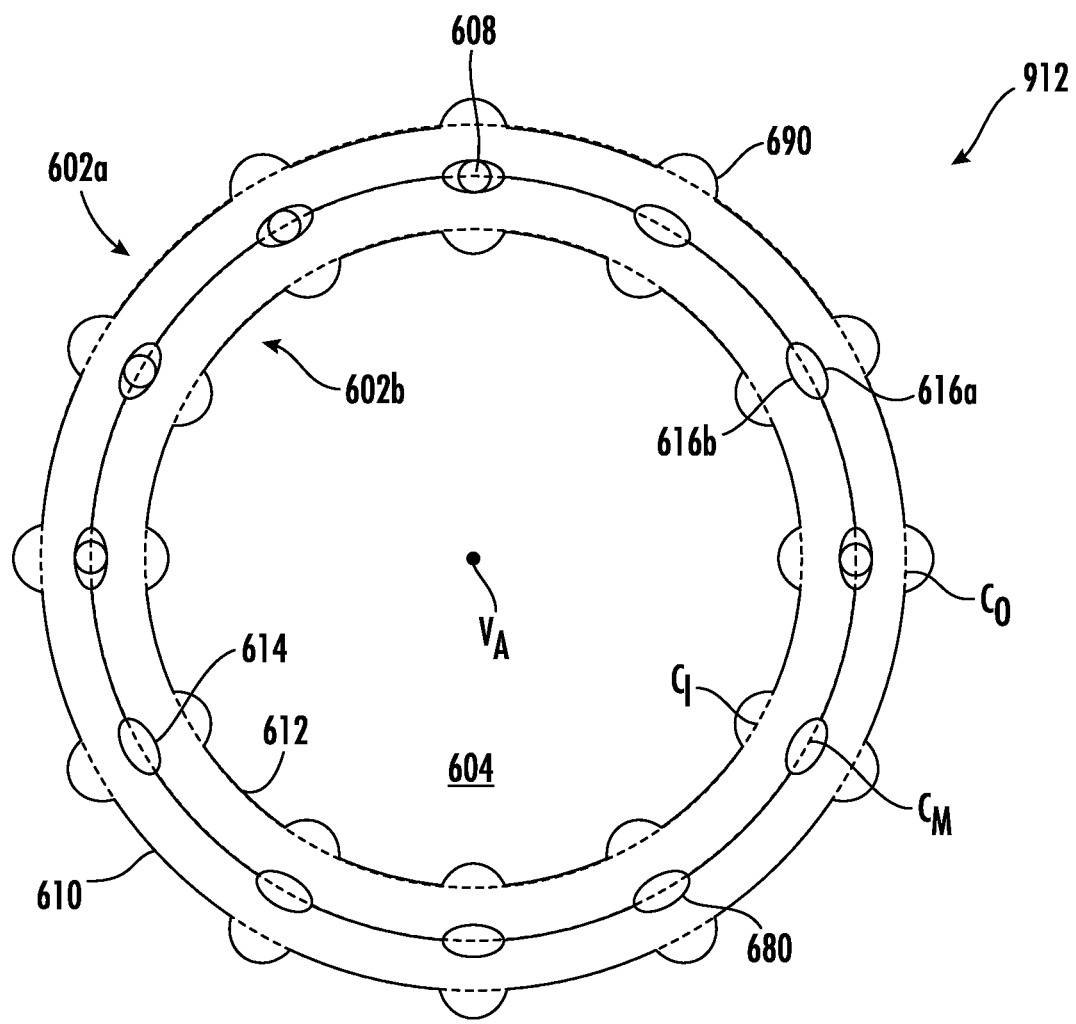
FIG. 19 illustrates a top view of another embodiment of a tower section, particularly illustrating adjacent wall elements according to the present disclosure.

Referring now to FIGS. 18A, 18B, and 19, respectively, further embodiments of a tower section of a tower structure of a wind turbine formed using additive manufacturing according to the present disclosure are illustrated. In particular, as shown in FIGS. 18A and 19, the tower section is a multi-wall tower structure (labeled as 812a and 912, respectively) with at least two wall elements, namely an outer wall element 602a and an inner wall element 602b. In contrast, FIG. 18B illustrates a single-wall tower section 812b.

In the illustrated embodiment of FIG. 18A, the outer wall element 602a and the inner wall element 602b each define a plurality of recesses 614 having circumferential openings 616a, 616b (e.g., scallop-shaped features defined by a curved shape 680). This allows for the formation of the recesses 614 (e.g., the central voids, each defined by the curved shape 680) between the outer wall element 602a and the inner wall element 602b at the junction of the circumferential opening 616a and the circumferential opening 616b. In such embodiments, the reinforcement members 608 can be placed entirely within the recesses 614 defining the central voids.

Moreover, in the illustrated embodiment of FIG. 18A, by placing the reinforcement members 608 within the recesses 614, the reinforcement member 608 may be situated at or near the midline reference curve ($C_M$) and, therefore, the neutral axis of the tower section 812a. Accordingly, compressive forces experienced by the wall elements 602a, 602b of the tower section 812a are more evenly distributed across each of the outer wall element 602a and the inner wall element 602b than is possible when the reinforcement members 608 are displaced from the neutral axis. FIG. 18B has a similar configuration, but is formed of a single wall element, rather than multiple wall elements.

Referring particularly to FIG. 19, the outer wall element 602a and the inner wall element 602b each define a plurality of recesses 614, similar to the embodiment of FIG. 18A. In addition, as shown, the tower section 912 of FIG. 19 includes a plurality of protrusions 690 on the inner and outer circumferential surfaces 610, 612 of the tower section 912.

Figure 20:
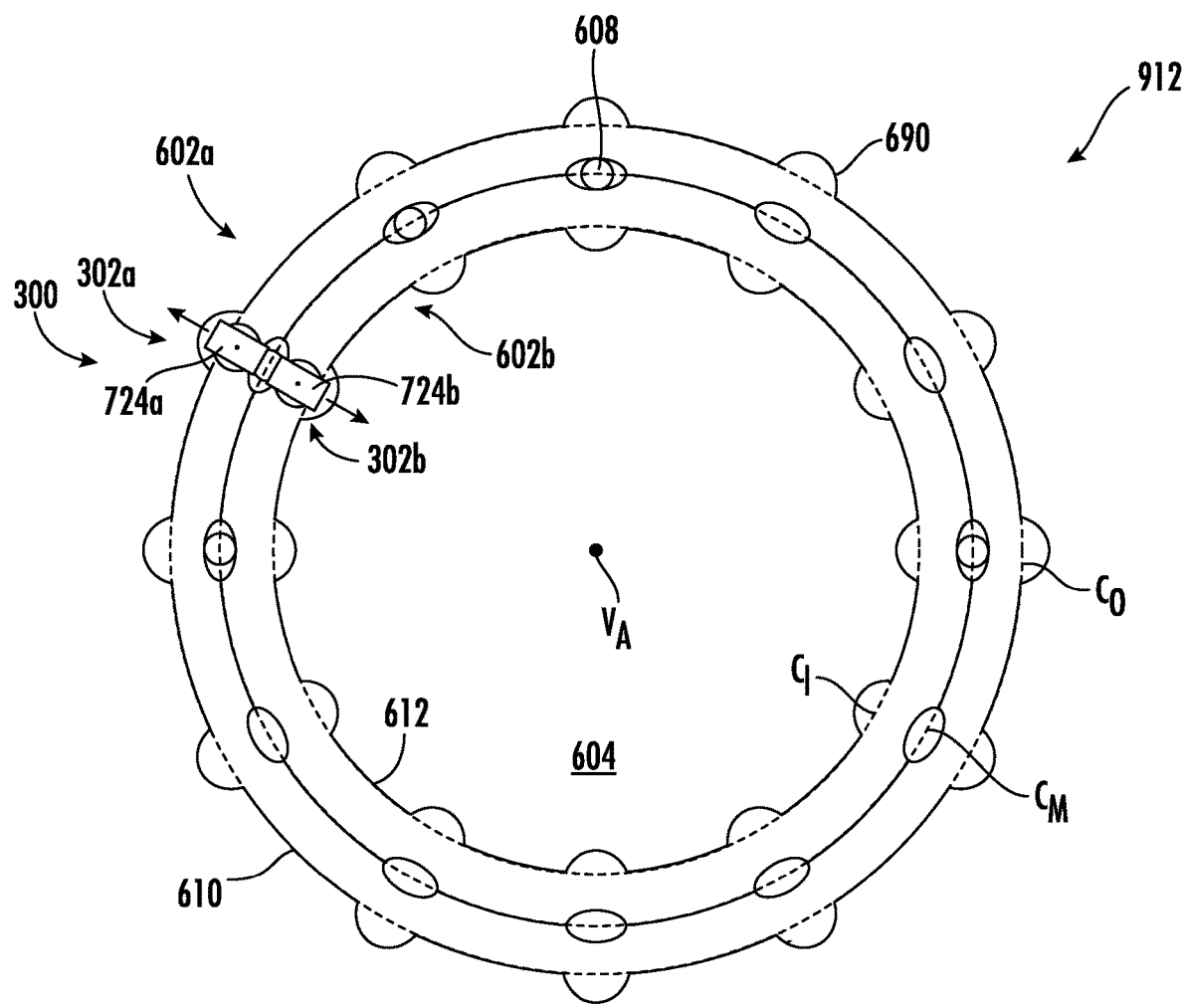
FIG. 20 illustrates a top view of an embodiment of a printhead assembly of an additive printing having multiple variable-width deposition nozzles for additively manufacturing a tower section according to the present disclosure.

Referring now to FIG. 20, the embodiment of the tower section 912 of FIG. 19 is illustrated, with printhead assemblies 302a, 302b of the additive printing device 300 being illustrated to depict how the tower section 912 is formed. As shown, the printhead assemblies 302a, 302b each have a variable-width deposition nozzle 724a, 724b for forming the outer wall element 602a and the inner wall element 602b, respectively. Thus, as shown, the outer wall element 602a can be printed and deposited via the variable-width deposition nozzle 724a of the printhead assembly 302a, and the inner wall element 602b can be printed and deposited via the variable-width deposition nozzle 724b of the printhead assembly 302b. The variable-width deposition nozzle 724a, 724b of each of the printhead assemblies 302a, 302b can be similar to that illustrated in FIG. 16. However, in the illustrated embodiment of FIG. 20, each of the printhead assemblies 302a, 302b may be instructed and operated to radially displace relative to the vertical axis and/or relative to the other to facilitate formation of at least one protrusion 690 in the outer circumferential surface 610 and/or the inner circumferential surface 612 of the outer wall element 602a and/or the inner wall element 602b.

Figure 21:
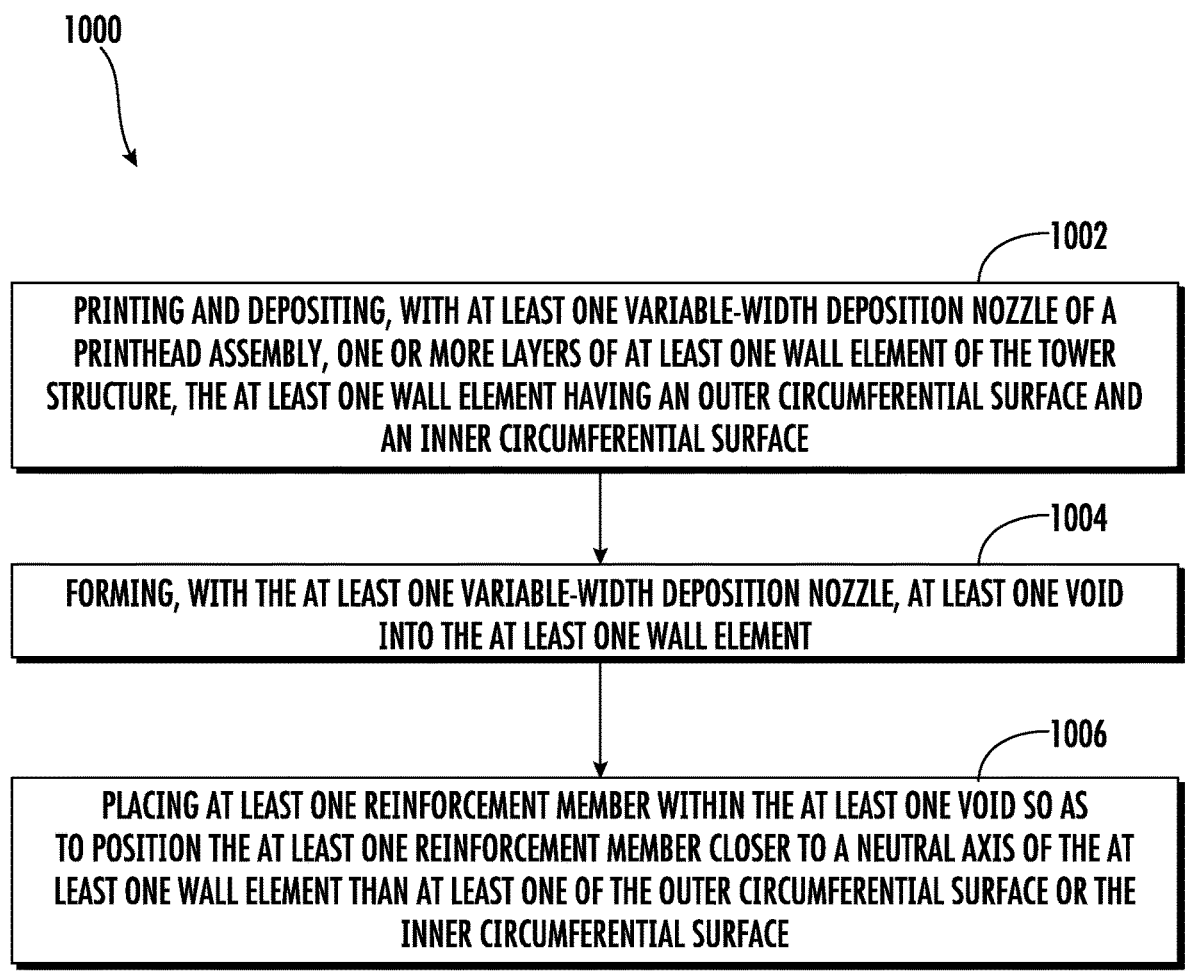
FIG. 21 illustrates a flow diagram of an embodiment of a method for manufacturing a tower structure according to the present disclosure.

Referring now to FIG. 21, a flow diagram of an embodiment of a method 1000 of manufacturing a tower structure according to the present disclosure is provided. In particular, the method 1000 can be used to form the tower structure 500 of FIGS. 1-20 using the additive printing device 40 of FIGS. 3-5, the additive printing device 300 of FIGS. 6 and 7, or any other additive printing device, to form any other suitable structure, tower, or tall structure. In this regard, for example, the controller 200 of FIG. 8 may be configured for implementing the method 1000. However, it should be appreciated that the method 1000 is discussed herein only to describe aspects of the present disclosure and is not intended to be limiting.

Further, though FIG. 21 depicts a control method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the tower structure 500 and the additive printing device 40, 300 as an example, it should be appreciated that these methods may be applied to the operation of additive printing device to form any suitable tower structure.

In particular, as shown at (1002), the method 1000 includes printing and depositing, with at least one variable-width deposition nozzle of a printhead assembly, one or more layers of at least one wall element of the tower structure, the at least one wall element having an outer circumferential surface and an inner circumferential surface.

As shown at (1004), the method 1000 includes forming, with the at least one variable-width deposition nozzle, at least one void into the at least one wall element.

As shown at (1006), the method 1000 includes placing at least one reinforcement member within the at least one void so as to position the at least one reinforcement member closer to a neutral axis of the at least one wall element than at least one of the outer circumferential surface or the inner circumferential surface.

In certain embodiments, the method 1000 may include establishing a fixed deposition path for the variable-width deposition nozzle by aligning and affixing the first side with respect to an inner reference curve or an outer reference curve of the at least one wall element; and establishing a variable deposition path for the variable-width deposition nozzle by allowing the second side to move with respect to the first side during printing and depositing to form the at least one void.

Further aspects of the present disclosure are provided by the subject matter of the following clauses:

A method for manufacturing a tower structure, the method comprising: printing and depositing, with at least one variable-width deposition nozzle of a printhead assembly, one or more layers of at least one wall element of the tower structure, the at least one wall element having an outer circumferential surface and an inner circumferential surface; forming, with the at least one variable-width deposition nozzle, at least one void into the at least one wall element; and placing at least one reinforcement member within the at least one void so as to position the at least one reinforcement member closer to a neutral axis of the at least one wall element than at least one of the outer circumferential surface or the inner circumferential surface.

The method of the preceding clause, wherein the variable-width deposition nozzle comprises a first side and a second side, the first side being fixed, the second side being movable with respect to the first side.

The method of the preceding clause, further comprising: establishing a fixed deposition path for the variable-width deposition nozzle by aligning and affixing the first side with respect to an inner reference curve or an outer reference curve of the at least one wall element; and establishing a variable deposition path for the variable-width deposition nozzle by allowing the second side to move with respect to the first side during printing and depositing to form the at least one void.

The method of the preceding clause, wherein forming, with the at least one variable-width deposition nozzle of the printhead assembly, the at least one void into the at least one wall element further comprises: forming, with the at least one variable-width deposition nozzle, at least one void into at least one of the outer circumferential surface, the inner circumferential surface, or therebetween, of the at least one wall element by establishing the variable deposition path.

The method of any of the preceding clauses, wherein forming, with the at least one variable-width deposition nozzle of the printhead assembly, the at least one void into the at least one wall element further comprises: forming, with the at least one variable-width deposition nozzle of the printhead assembly, at least one void between two or more wall elements of the tower structure.

The method of the preceding clause, wherein printing and depositing, with at least one variable-width deposition nozzle of the printhead assembly, the one or more layers of the at least one wall element of the tower structure further comprises: printing and depositing, with a first variable-width deposition nozzle of the printhead assembly, the one or more layers of a first wall element of the at least one wall element of the tower structure; and concurrently printing and depositing, with a second variable-width deposition nozzle of the printhead assembly, the one or more layers of a second wall element of the at least one wall element of the tower structure adjacent to the first wall element.

The method of the preceding clause, wherein the first wall element is an outer wall element and the second wall element is an inner wall element, and wherein forming, with the at least one variable-width deposition nozzle, the at least one void into the at least one wall element further comprises: forming, with the first variable-width deposition nozzle, one or more of a first plurality of recesses into the first wall element; and forming, with the second variable-width deposition nozzle, one or more of a second plurality of recesses into the second wall element.

The method of any of the preceding clauses, wherein the variable-width deposition nozzle further comprises a flow regulator operably coupled between the first side and the second side, wherein forming the at least one void into the at least one wall element further comprises: printing and depositing, via the variable-width deposition nozzle, the at least one wall element along the fixed and variable deposition paths, wherein the variable deposition path defines the at least one void; and regulating, via the flow regulator, the printing and depositing to form the at least one void.

The method of any of the preceding clauses, wherein the at least one void defines at least one of an arcuate shape or a non-arcuate shape.

The method of any of the preceding clauses, wherein the at least one reinforcement member is one or more of a plurality of reinforcement members and the at least one void is one or more of a plurality of voids, and wherein the placing at least one reinforcement member within the at least one void further comprises: placing at least one of the plurality of reinforcement members within each of the plurality of voids.

A tower structure, comprising: a base tower section comprising at least one printed wall element, the at least one printed wall element having an outer circumferential surface and an inner circumferential surface; a transition assembly arranged adjacent to the base tower section; at least one void formed into the at least one printed wall element during printing and depositing of the at least one printed wall element; and at least one reinforcement member positioned within the at least one void, the at least one reinforcement member extending through at least a portion of the base tower section and at least partially through the transition assembly; wherein the at least one reinforcement member in the at least one void positions the at least one reinforcement member closer to a neutral axis of the at least one printed wall element than at least one of the outer circumferential surface or the inner circumferential surface.

The tower structure of the preceding clause, wherein the at least one void formed into the at least one printed wall element is at least one void formed into at least one of the outer circumferential surface or the inner circumferential surface, or therebetween, of the at least one printed wall element.

The tower structure of any of the preceding clauses, wherein the at least one void formed into the at least one printed wall element is at least one void formed between two or more printed wall elements of the base tower section.

The tower structure of any of the preceding clauses, wherein the at least one void defines at least one of an arcuate shape or a non-arcuate shape.

A tower structure, the tower structure comprising: at least two printed wall elements arranged adjacent to each other; at least one void between the at least two printed wall elements formed during printing and depositing of the at least two printed wall elements; and at least one reinforcement member positioned within the at least one void; wherein the at least one reinforcement member in the at least one void places the at least one reinforcement member closer to a neutral axis of the tower structure than at least one of an outer circumferential surface or an inner circumferential surface of the tower structure.

The tower structure of the preceding clause, further comprising: a transition assembly, the at least one reinforcement member engaged to the transition assembly, wherein the at least one reinforcement member extends through at least a portion of the tower structure.

The tower structure of the preceding clause, wherein the at least two printed wall elements form a base tower section, wherein the transition assembly comprises a wall component arranged atop the base tower section, and wherein the at least one reinforcement member extends through the transition assembly.

The tower structure of any of the preceding clauses, wherein the at least one void formed between the at least two printed wall elements comprises a recess formed into an outer surface of a first wall element of the at least two printed wall elements and a recess formed into an inner surface of a second wall element of the at least two printed wall elements.

The tower structure of the preceding clause, wherein the recess formed into the first wall element or the recess formed into the second wall element defines one of an arcuate shape or a non-arcuate shape.

The tower structure of any of the preceding clauses, wherein the recess formed into the first wall element and the second wall element of the at least two printed wall elements comprises at least one of an arcuate groove or a non-arcuate notch.

This written description uses embodiments to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a tower structure, the method comprising:
   printing and depositing, with at least one variable-width deposition nozzle of a printhead assembly, one or more layers of at least one wall element of the tower structure, the at least one wall element having an outer circumferential surface and an inner circumferential surface;
   forming, with the at least one variable-width deposition nozzle, a plurality of voids into the at least one wall element, at least some of the plurality of voids arranged on the outer circumferential surface and the rest of the plurality of voids arranged on the inner circumferential surface; and
   placing at least one reinforcement member within at least one of the plurality of voids so as to position the at least one reinforcement member at a neutral axis of the tower structure.

2. The method of claim 1, wherein the variable-width deposition nozzle comprises a first side and a second side, the first side being fixed, the second side being movable with respect to the first side.

3. The method of claim 2, further comprising:
   establishing a fixed deposition path for the variable-width deposition nozzle by aligning and affixing the first side with respect to an inner reference curve or an outer reference curve of the at least one wall element; and
   establishing a variable deposition path for the variable-width deposition nozzle by allowing the second side to move with respect to the first side during printing and depositing to form the at least one void.

4. The method of claim 3, wherein forming, with the at least one variable-width deposition nozzle of the printhead assembly, the at least one void into the at least one wall element further comprises:
   forming, with the at least one variable-width deposition nozzle, at least one void into at least one of the outer circumferential surface, the inner circumferential surface, or therebetween, of the at least one wall element by establishing the variable deposition path.

5. The method of claim 3, wherein the variable-width deposition nozzle further comprises a flow regulator operably coupled between the first side and the second side, wherein forming the at least one void into the at least one wall element further comprises:
    printing and depositing, via the variable-width deposition nozzle, the at least one wall element along the fixed and variable deposition paths, wherein the variable deposition path defines the at least one void; and
    regulating, via the flow regulator, the printing and depositing to form the at least one void.

6. The method of claim 1, wherein forming, with the at least one variable-width deposition nozzle of the printhead assembly, the at least one void into the at least one wall element further comprises:
    forming, with the at least one variable-width deposition nozzle of the printhead assembly, at least one void between two or more wall elements of the tower structure.

7. The method of claim 6, wherein printing and depositing, with at least one variable-width deposition nozzle of the printhead assembly, the one or more layers of the at least one wall element of the tower structure further comprises:
    printing and depositing, with a first variable-width deposition nozzle of the printhead assembly, the one or more layers of a first wall element of the at least one wall element of the tower structure; and
    concurrently printing and depositing, with a second variable-width deposition nozzle of the printhead assembly, the one or more layers of a second wall element of the at least one wall element of the tower structure adjacent to the first wall element.

8. The method of claim 7, wherein the first wall element is an outer wall element and the second wall element is an inner wall element, and wherein forming, with the at least one variable-width deposition nozzle, the at least one void into the at least one wall element further comprises:
    forming, with the first variable-width deposition nozzle, one or more of a first plurality of recesses into the first wall element; and
    forming, with the second variable-width deposition nozzle, one or more of a second plurality of recesses into the second wall element.

9. The method of claim 1, wherein the at least one void defines at least one of an arcuate shape or a non-arcuate shape.

10. The method of claim 1, wherein the at least one reinforcement member is one or more of a plurality of reinforcement members and the at least one void is one or more of a plurality of voids, and wherein the placing at least one reinforcement member within the at least one void further comprises:
    placing at least one of the plurality of reinforcement members within each of the plurality of voids.

11. A tower structure, comprising:
    a base tower section comprising at least one printed wall element including one or more layers, the at least one printed wall element having an outer circumferential surface and an inner circumferential surface;
    a transition assembly arranged adjacent to the base tower section;
    a plurality of voids formed into the at least one printed wall element during printing and depositing of the at least one printed wall element, at least some of the plurality of voids arranged on the outer circumferential surface and the rest of the plurality of voids arranged on the inner circumferential surface; and
    at least one reinforcement member positioned within at least one of the plurality of voids, the at least one reinforcement member extending through at least a portion of the base tower section and at least partially through the transition assembly;
    wherein the at least one reinforcement member in the at least one void positions the at least one reinforcement member at a neutral axis of the tower structure.

12. The tower structure of claim 11, wherein the at least one void formed into the at least one printed wall element is at least one void formed into at least one of the outer circumferential surface or the inner circumferential surface, or therebetween, of the at least one printed wall element.

13. The tower structure of claim 11, wherein the at least one void formed into the at least one printed wall element is at least one void formed between two or more printed wall elements of the base tower section.

14. The tower structure of claim 11, wherein the at least one void defines at least one of an arcuate shape or a non-arcuate shape.

* * * * *